US012789353B2

(12) United States Patent
Fedrigon et al.

(10) Patent No.: US 12,789,353 B2
(45) Date of Patent: Nov. 10, 2026

(54) TOOL HOLDERS, ACCESSORY MOUNTING PLATFORMS, STORAGE CASES, AND OTHER ACCESSORY COMPONENTS AND METHODS ASSOCIATED WITH A TOOL

(71) Applicant: Techtronic Cordless GP, Anderson, SC (US)

(72) Inventors: Jeremy Fedrigon, Greenville, SC (US); Joseph Purdin, Pelzer, SC (US); Thomas Evatt, Six Mile, SC (US); Cam Craig, Greenville, SC (US); Colton Faddis, Easley, SC (US); Allison Chesser, Greenville, SC (US); Trevor Fauss, Greenville, SC (US); Christopher Heintz, Greenville, SC (US); Charles M. Wacker, II, Greenville, SC (US); Jeffrey Groves, Greenville, SC (US); Ben Pollite, Greenville, SC (US); Emily Costelow, Greenville, SC (US); Keith Saporsky, Greenville, SC (US); Nate Hill, Greenville, SC (US); Keith Lombardi, Easley, SC (US); Drew Dahill, Greenville, SC (US); Ashley Antley, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/917,064

(22) Filed: Oct. 16, 2024

(65) Prior Publication Data

US 2025/0121487 A1 Apr. 17, 2025

Related U.S. Application Data

(60) Provisional application No. 63/590,612, filed on Oct. 16, 2023.

(51) Int. Cl.
*B25F 5/02* (2006.01)
*B25B 21/00* (2006.01)
(Continued)

(52) U.S. Cl.
CPC ............... *B25H 3/022* (2013.01); *B25F 5/02* (2013.01); *B25B 21/00* (2013.01); *B25F 5/029* (2013.01); *B25H 3/003* (2013.01)

(58) Field of Classification Search
CPC ... B25F 5/02; B25F 5/029; B25F 5/00; B25G 1/08; B25H 3/022; B25H 3/003; B25H 3/006; Y10T 408/96; B25B 21/007
(Continued)

(56) References Cited

U.S. PATENT DOCUMENTS 3,631,572 A * 1/1972 Lange .................... A45C 11/38 224/908
4,673,070 A * 6/1987 Ambal ................. A45C 7/0086 190/110
(Continued)

FOREIGN PATENT DOCUMENTS

CN 203712679 U 7/2014
CN 105437166 B 7/2017
(Continued)

OTHER PUBLICATIONS

European Search Report Corresponding to U.S. Appl. No. 24/204,707 on Feb. 14, 2025.
(Continued)

*Primary Examiner* — Gideon R Weinerth
(74) *Attorney, Agent, or Firm* — Dority & Manning, P.A.

(57) ABSTRACT

An accessory mounting platform for a tool, the accessory mounting platform including: a body configured to be removably coupled to the tool; a first rail coupled to the body, the first rail including a rail head configured to slidably
(Continued)

receive an accessory and couple the accessory to the tool; and a locking component configured to selectively retain the accessory on the first rail, wherein the locking component automatically moves from a locked state to an unlocked state when the accessory is slid along the first rail over the locking component in a first direction, and wherein the locking component automatically moves to the locked state once the accessory reaches a locked position on the first rail.

20 Claims, 31 Drawing Sheets

(51) Int. Cl.
*B25F 5/00* (2006.01)
*B25H 3/00* (2006.01)
*B25H 3/02* (2006.01)

(58) Field of Classification Search
USPC .................... 206/372; 81/490, 177.4; 408/16
See application file for complete search history.

(56) References Cited

U.S. PATENT DOCUMENTS

| | | | | | |
|---|---|---|---|---|---|
| 4,932,294 | A * | 6/1990 | Chang | B25F 5/02 81/177.4 |
| 5,056,661 | A * | 10/1991 | Balzano | B25F 5/029 D3/304 |
| 6,364,580 | B1 * | 4/2002 | Dils | B25F 5/029 408/16 |
| 7,217,069 | B2 * | 5/2007 | Dils | G01V 3/15 324/67 |
| 7,246,704 | B2 | 7/2007 | Brunson | |
| 7,322,470 | B2 | 1/2008 | Brunson | |
| 7,331,455 | B2 | 2/2008 | Lin | |
| 7,591,616 | B1 | 9/2009 | Kerner | |
| 7,931,143 | B1 | 4/2011 | Lin | |
| 8,066,268 | B2 * | 11/2011 | Brauer | B25F 5/029 269/130 |
| 9,333,638 | B2 | 5/2016 | Powell et al. | |
| 9,701,008 | B2 | 7/2017 | Cho | |
| 9,975,233 | B2 | 5/2018 | Powell | |
| 10,166,670 | B2 | 1/2019 | Larsson | |
| 10,183,394 | B1 | 1/2019 | Dagnan, III et al. | |
| 10,870,195 | B2 * | 12/2020 | Sergyeyenko | B25F 5/029 |
| 11,260,514 | B2 | 3/2022 | Hoossainy et al. | |
| 11,819,112 | B1 | 11/2023 | Daniels | |
| 12,011,820 | B2 * | 6/2024 | Moss | B25B 21/00 |
| 12,542,305 | B2 * | 2/2026 | Liu | H01M 10/4207 |
| 2004/0079662 | A1 | 4/2004 | Wang | |
| 2004/0134954 | A1 | 7/2004 | Myron | |
| 2006/0104735 | A1 | 5/2006 | Zeiler et al. | |
| 2007/0065246 | A1 * | 3/2007 | Baber | B25F 5/029 409/182 |
| 2007/0175785 | A1 | 8/2007 | Sharp | |
| 2007/0235360 | A1 | 10/2007 | Lin | |
| 2007/0241159 | A1 | 10/2007 | Chang | |
| 2008/0000939 | A1 | 1/2008 | Walsh | |
| 2010/0200446 | A1 | 8/2010 | Vasudeva | |
| 2011/0147031 | A1 * | 6/2011 | Matthias | B25F 5/02 173/171 |
| 2014/0097217 | A1 | 4/2014 | Walsh | |
| 2016/0167219 | A1 * | 6/2016 | Cho | A45F 5/02 224/666 |
| 2016/0236342 | A1 | 8/2016 | Evatt et al. | |
| 2017/0095921 | A1 | 4/2017 | Madsen et al. | |
| 2017/0259422 | A1 | 9/2017 | Takeyama et al. | |
| 2019/0168376 | A1 | 6/2019 | Brocket et al. | |
| 2020/0055176 | A1 | 2/2020 | Curchod | |
| 2020/0094396 | A1 | 3/2020 | Steiner | |
| 2020/0324399 | A1 | 10/2020 | Christen et al. | |
| 2020/0384631 | A1 | 12/2020 | Reed et al. | |
| 2021/0237253 | A1 | 8/2021 | Moss et al. | |
| 2021/0245358 | A1 | 8/2021 | Hohl et al. | |
| 2021/0394354 | A1 | 12/2021 | Miley et al. | |
| 2022/0288769 | A1 | 9/2022 | Zolno et al. | |
| 2022/0355462 | A1 | 11/2022 | Cho | |
| 2023/0061938 | A1 | 3/2023 | Evatt et al. | |
| 2023/0092514 | A1 | 3/2023 | Brocket et al. | |
| 2023/0364771 | A1 | 11/2023 | Craig et al. | |
| 2025/0083298 | A1 | 3/2025 | Fischer et al. | |
| 2025/0121487 | A1 * | 4/2025 | Fedrigon | B25H 3/022 |
| 2025/0128396 | A1 * | 4/2025 | Young | B25F 5/02 |
| 2025/0196312 | A1 * | 6/2025 | Anderson | B23B 45/02 |

FOREIGN PATENT DOCUMENTS

| | | | |
|---|---|---|---|
| CN | 209954636 | U | 1/2020 |
| CN | 211916727 | U | 11/2020 |
| CN | 215281830 | U | 12/2021 |
| CN | 217669213 | U | 10/2022 |
| DE | 202010000452 | U1 | 8/2010 |
| DE | 202014100082 | U1 | 4/2014 |
| DE | 202017104787 | U1 | 9/2017 |
| EP | 3827932 | B1 | 2/2022 |
| JP | 2014012301 | A | 1/2014 |
| KR | 20210023850 | A | 3/2021 |
| WO | WO2022024626 | A1 | 2/2022 |
| WO | WO2023091498 | A1 | 5/2023 |

OTHER PUBLICATIONS

European Search Report Corresponding to U.S. Appl. No. 25/161,094 on Jul. 3, 2025.

* cited by examiner

TOOL HOLDERS, ACCESSORY MOUNTING PLATFORMS, STORAGE CASES, AND OTHER ACCESSORY COMPONENTS AND METHODS ASSOCIATED WITH A TOOL

CROSS-REFERENCE TO RELATED APPLICATIONS

The present application claims priority to U.S. Provisional Patent Application 63/590,612 filed on Oct. 16, 2023, the disclosure of which is incorporated by reference herein in its entirety.

FIELD

The present disclosure relates generally to tools, and more particularly to tool holders, accessory mounting platforms, and storages cases associated with tools, and more particularly power tools.

BACKGROUND

Tools reduce the amount of work required to complete tasks. As a result, operators are able to achieve more in the same duration of time while expending less effort. However, the operator is still required to perform certain auxiliary functionality and is required to carry tools and implements for use with the tool to allow for rapid switching between tool functionality.

Accordingly, improved tool holders and accessory mounting platforms are desired in the art. In particular, tool holders and accessory mounting platforms which provide quick, easy, and accessible swapping of tool functionality and that are readily available to the operator during use of the tool would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, an accessory mounting platform for a tool is provided. The accessory mounting platform includes a body configured to be removably coupled to the tool; a first rail coupled to the body, the first rail comprising a rail head configured to slidably receive an accessory and couple the accessory to the tool; and a locking component configured to selectively retain the accessory on the first rail, wherein the locking component automatically moves from a locked state to an unlocked state when the accessory is slid along the first rail over the locking component in a first direction, and wherein the locking component automatically moves to the locked state once the accessory reaches a locked position on the first rail.

In accordance with another embodiment, a tool is provided. The tool includes a tool body; a working element coupled to the tool body; an accessory mounting platform comprising: a body coupled to the tool body; a first rail coupled to the body; and a locking component having a locked state and an unlocked state; and an accessory removably coupled to the first rail of the accessory mounting platform, wherein the accessory is selectable from a plurality of accessories each having a different functionality, wherein the locking component automatically moves from a locked state to an unlocked state when the accessory is slid along the first rail over the locking component in a first direction, and wherein the locking component automatically moves to the locked state once the accessory reaches a locked position on the first rail.

In accordance with another embodiment, a method of coupling an accessory to a tool is provided. The method includes aligning the accessory with a rail of an accessory mounting platform coupled to the tool; and translating the accessory along the rail in a first direction until the accessory contacts a stop feature, wherein a locking component automatically locks the accessory to the rail when the accessory contacts the stop feature.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
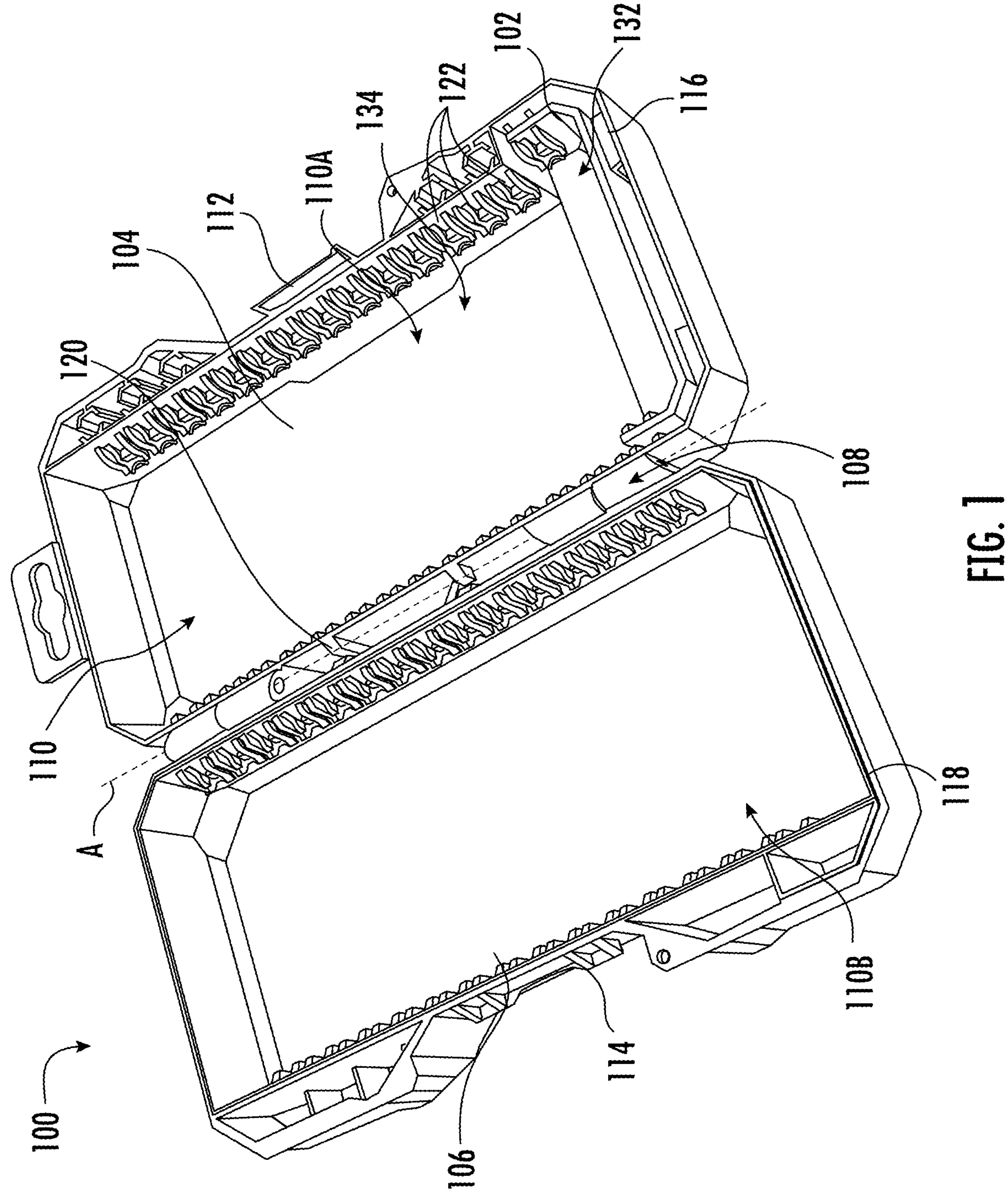
FIG. 1 is a perspective view of a case for holding one or more tools in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The embodiments described herein may be used with tools, such as hand tools, storage tools, and power tools. The term "power tool" as used herein is intended to refer to an electro-mechanical tool. The power tool includes a working element, such as a rotatable working element like a drill, a reciprocating working element like a reciprocating blade, or a linear actuated working element like a caulk gun, that is driven by a motor. The motor receives power from a power source such as a power cord or a battery, e.g., an onboard battery or a removable battery, when an operator actuates the power tool from an inactive mode to a work mode. The power tool includes control circuitry that controls one or more operating aspects of the power tool in view of operator inputs. In an embodiment, the power tool is a handheld power tool. Handheld power tools are mobile tools that easily picked up and operated in a held position. Handheld power tools can include, for example, drills, saws, caulk guns, ratchet wrenches, and the like.

Unless defined to the contrary, terms like "accessory mounting platform", "holder", "tool holder" and the like may be used interchangeably to refer to components that allow for removable attachment of one or more external structures to the tool. These external structures may include accessories that are used in combination with the tool to enhance operating capability of the tool (like vacuum hose ports), accessories that store or hold implements which can interchangeably used with the tool (like driver and drill bits), or accessories that an operator may want nearby during certain operations but which are not used in direct concert with the tool (like levels and speed squares). In some embodiments, the external structures may be directly supported by the tool. For example, a speed square may include integral mounting features that allow the speed square to be directly coupled to the tool. In other embodiments, the external structures may be indirectly supported by the tool. For example, drill bits may be supported in a bit holder that includes mounting features allowing the bit holder to be directly coupled to the tool.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, accessory mounting platforms described herein can be removably coupled to tools, such as handheld power tools, and allow an operator quick access to interchangeable accessories. The accessory can be selected from a group of accessories each having a different functionality. As such, the operator can quickly and easily switch between different accessory functionality when moving between different jobsites or work processes. By way of example, the accessory can include a bit holder, a vacuum port, a light holder, a battery holder, or another accessory as described in greater detail below.

Figure 2:
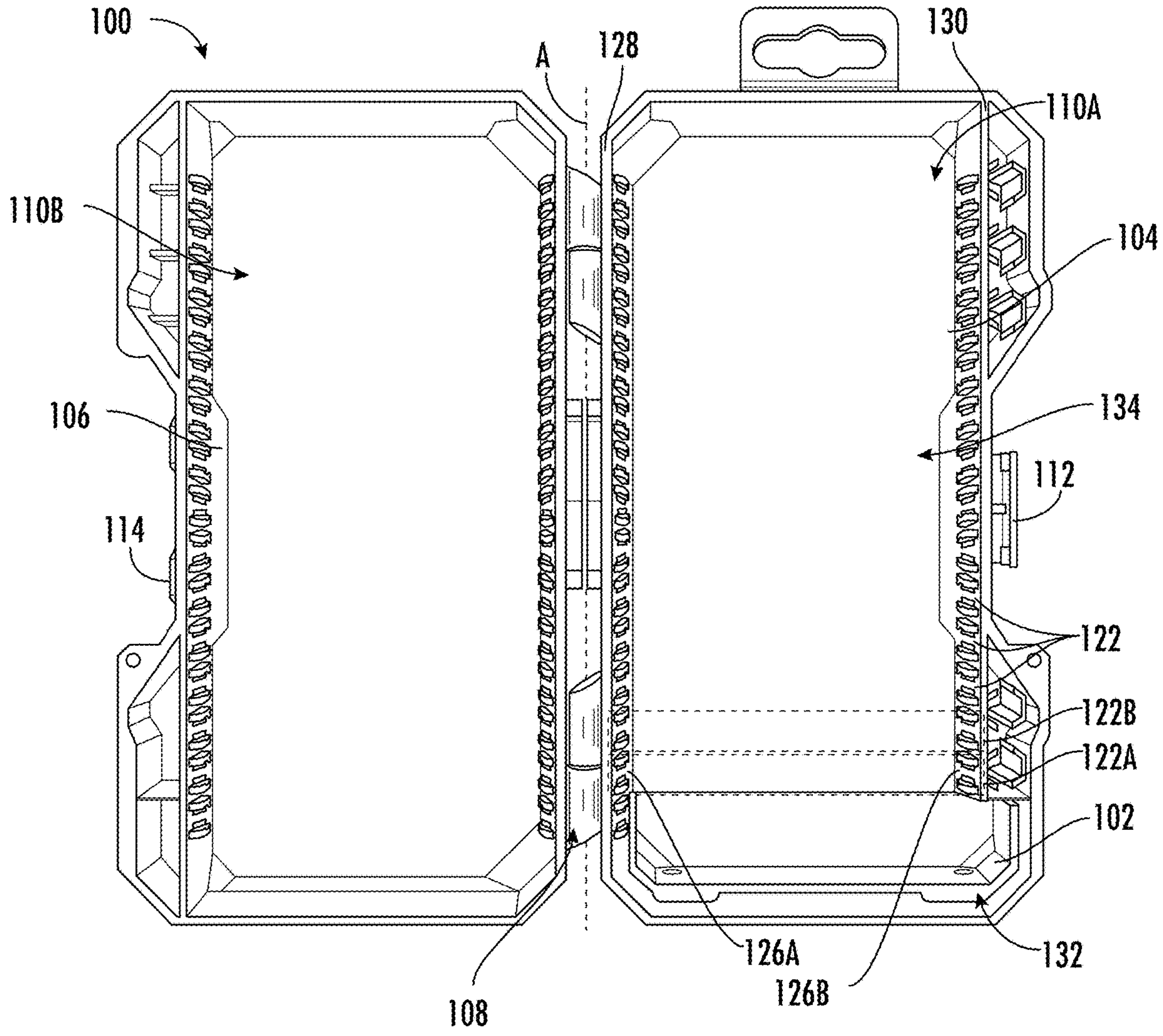
FIG. 2 is a front view of the case in accordance with embodiments of the present disclosure.
Figure 3:
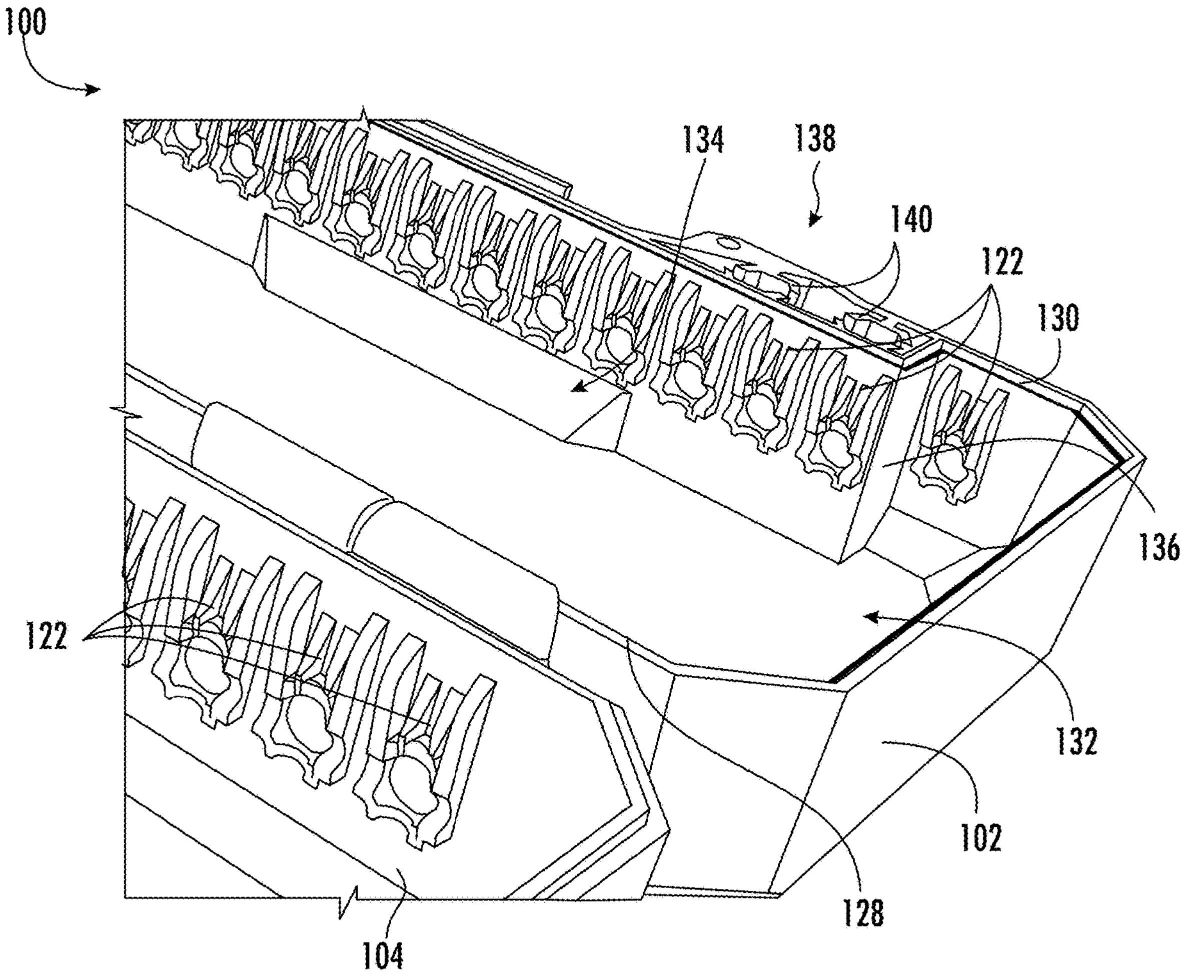
FIG. 3 is an enlarged perspective view of a portion of the case in accordance with embodiments of the present disclosure.

Referring now to the drawings, FIGS. 1 to 3 illustrate a case 100 for holding one or more tools or implements in accordance with an embodiment. By way of non-limiting example, the tools and implements can include drill bits, drivers, socket wrenches, or the like. FIG. 1 illustrates a perspective view of the case 100 in an open configuration. FIG. 2 illustrates a side view of the case 100 in the open configuration. FIG. 3 illustrates a perspective view of an enlarged portion of the case 100 as seen in the open configuration without a tool holder 102 (FIGS. 1 and 2).

Referring initially to FIGS. 1 and 2, the case 100 generally includes a first component 104 and a second component 106 selectively moveable relative to one another. In an embodiment, the first and second components 104 and 106 are coupled together through a moveable interface 108. By way of non-limiting example, the moveable interface 108 can include a hinged interface including pins in one or both of the first or second components 104 or 106 that are relatively rotatable with respect to openings in the other of the first or second components 104 or 106. The first and second components 104 and 106 can be hinged relative to one another about the hinged interface 108 to open and close the case 100. By way of another example, the moveable interface 108 can include a living hinge, a sliding rail interface which allows the first and second components 104 and 106 to translate relative to one another between the open configuration and a closed configuration, another suitable interface type, or any combination thereof. In an embodiment, the first and second components 104 and 106 can be separable and detachable from one another. Accordingly, the first and second components 104 and 106 can be freely moved relative to each other, used independent of one another, or even stored separately.

In a particular embodiment, the first and second components 104 and 106 can be rotated relative to one another about an axis A to reconfigure the case 100 between the open configuration and the closed configuration. The first and second components 104 and 106 can further be translated relative to one another, e.g., along the axis A, to reconfigure the case 100 between a first state, where the first and second components 104 and 106 are coupled together, and a second state, where the first and second components 104 and 106 are separate and detached from one another.

In certain instances, the first component 104 may be referred to as a back and the second component 106 may be referred to as a cover which selectively covers the back when the case 100 is in the closed configuration. However, this designation is not meant to be limiting and is provided only as an example. In some instances, the first and second components 104 and 106 can have a generally similar, or same, shape as one another. In other instances, the first and second components 104 and 106 can be dissimilarly shaped. In an embodiment, the first and second components 104 and 106 can be formed from the same, or similar, materials. In another embodiment, the first and second components 104 and 106 can be formed from different materials. In an embodiment, at least one of the first or second components 104 or 106 can include a window or similar construction which permits viewing of an internal volume of the case 100.

In the closed configuration, the case 100 can define an internal volume 110 (illustrated in FIGS. 1 and 2 by sub-volumes 110A and 110B which combine to form the internal volume 110 when the case 100 is in the closed configuration). In the open configuration, the sub-volumes 110A and 110B can each define a volume in which the tool holder 102 can be received, stored and accessed by a user.

In an embodiment, movement between the open and closed configurations can occur through rotational displacement between the first and second components 104 and 106 about the axis A by at least 25°, such as at least 30°, such as at least 45°, such as at least 50°, such as at least 60°, such as at least 70°, such as at least 80°, such as at least 90°, such as at least 100°, such as at least 110°, such as at least 120°, such as at least 130°, such as at least 140°, such as at least 150°, such as at least 160°, such as at least 170°. In a more particular embodiment, movement between the open and closed configurations can occur through rotational displacement between the first and second components 104 and 106 about the axis A by approximately 180°. In some instances, the first and second components 104 and 106 can rotate beyond 180° when moving between the open and closed configurations. In some instances, the case 100 can include one or more stops 120 that stop rotation of the first and second components 104 and 106 about the axis A upon rotating to the open configuration.

In an embodiment, the first and second components 104 and 106 can be selectively locked in the closed configuration. For example, the first component 104 can include a first engagement mechanism 112, such as a latch, that interfaces with a second engagement mechanism 114, such as a lip, of the second component 106. In some instances, the first and second engagement mechanisms 112 and 114 automatically interface with and lock relative to one another when introduced together, e.g., by moving the first and second components 104 and 106 together about the axis A. In other instances, the user may interface and lock the first and second engagement mechanism 112 and 114 together manually after the first and second components 104 and 106 are moved to the closed configuration. To unlock the case 100, the user can disengage the first engagement mechanism 112 from the second engagement mechanism 114, or vise versa.

In an embodiment, the first and second components 104 and 106 can include mating structures 116 and 118, respectively, which interface with one another when the case 100 is in the closed configuration. By way of non-limiting example, the mating structures 116 and 118 can include a tongue and groove interface, a sealed interface where, e.g., the mating structure 116 is a seal and the mating structure 118 is a sealing surface against which the seal acts upon to seal the case 100. The above arrangement may also be reversed or altered in yet another configuration or arrangement.

In use, the case 100 can hold and store various components, tools, equipment, or tool holders while protecting some or all of those components, tools, equipment, or tool holders from the environment as well as jobsite and worksite hazards. The following description relates to a tool holder 102. However, it should be understood that other components, tools or equipment can be used in the case 100 in lieu of the tool holder 102 or in addition to the tool holder 102.

In an embodiment, the case 100 can include one or more engagement structures 122 configured to be coupled with one or more complementary engagement structures 124 (FIGS. 4 and 5) of the tool holder 102. When the engagement structures 122 and complementary engagement structures 124 are coupled together, the tool holder 102 can be retained by the case 100. When disengaged, the tool holder 102 can be removed from the case 100.

The one or more engagement structures 122 can be arranged in sets, including, e.g., a first set of engagement structures 122A and a second set of engagement structures 122B. The case 100 can include at least two sets of engagement structures 122, such as at least five sets, such as at least ten sets, such as at least fifteen sets, such as at least twenty sets, such as at least twenty-five sets, such as at least thirty sets. Each set of engagement structures 122 can include a first engagement structure 126A and a second engagement structure 126B. In an embodiment, the first engagement structure 126A can be disposed on a first lateral side 128 of the case 100 and the second engagement structure 126B can be disposed on a second lateral side 130 of the case 100, wherein the first and second lateral sides 128 and 130 are opposite one another. When coupled with the case 100, the tool holder 102 can extend between the first and second lateral sides 128 and 130 to couple with the first and second engagement structure 126A and 126B.

As depicted in FIGS. 1 and 2, the tool holder 102 is disposed in a first region 132 of the case 100. The first region 132 can define a first lateral width, as measured between the first and second lateral sides 128 and 130. The case 100 can further include a second region 134 having a second lateral width, as measured between the first and second lateral sides 128 and 130, different than the first lateral width. In the illustrated embodiment, the second lateral width is less than the first lateral width. The first and second regions 132 and 134 can also define amounts of sets of engagement structures 122. For example, the first region 132 depicted in FIG. 1 includes a single set of engagement structures 122 while the second region 132 includes fourteen sets of engagement structures 122. These numbers of sets are intended to be illustrative only. In other embodiments, the first region 132 can include a single set of engagement structures 122 and the second region 134 can include a plurality engagement structures 122, such as at least two sets of engagement structures 122, such as at least five sets of engagement structures 122, such as at least ten sets of engagement structures 122. In yet another embodiment, the first region 132 can include a plurality of sets of engagement structures 122.

Different tool holders 102 can be received at each of the first and second regions 132 and 134. For example, relatively larger tool holders 102 can be received at the first region 132 while relatively smaller tool holders 102 can be received at the second region 134.

In accordance with an embodiment and as depicted in FIG. 3, the engagement structures 122 in the first and second regions 132 and 134 can be the same as one another. That is, the engagement structures 122 can share a common shape, a common size, or both a common shape and a common size. In accordance with another embodiment, the engagement structures 122 in the first region can be different from the engagement structures 122 in the second region 134. For instance, the engagement structures 122 can have different relative shapes, different relative sizes, or both.

In an embodiment, the first and second regions 132 and 134 can be separated from each other by a bulkhead 136. In some embodiments, the bulkhead 136 can extend across an entire distance between the first and second lateral sides 128 and 130. In other embodiments, the bulkhead 136 can extend only partially between the first and second lateral sides 128 and 130. By way of example, the bulkhead 136 can extend less than 90% of the distance between the first and second lateral sides 128 and 130, such as less than 80% of the distance between the first and second lateral sides 128 and 130, such as less than 70% of the distance between the first and second lateral sides 128 and 130, such as less than 60% of the distance between the first and second lateral sides 128 and 130, such as less than 50% of the distance between the first and second lateral sides 128 and 130, such as less than 40% of the distance between the first and second lateral sides 128 and 130, such as less than 30% of the distance between the first and second lateral sides 128 and 130, such as less than 20% of the distance between the first and second lateral sides 128 and 130, such as less than 10% of the distance between the first and second lateral sides 128 and 130. In an embodiment, the bulkhead 136 can include a single bulkhead extending from one of the first and second lateral sides 128 or 130. In another embodiment, the bulkhead 136 can include a single bulkhead spaced apart from both the first and second lateral sides 128 and 130. In yet another embodiment, the bulkhead 136 can include a plurality of bulkheads including a first bulkhead disposed adjacent to the first lateral side 128 and a second bulkhead adjacent to the second lateral side 130.

Referring to FIGS. 1 to 3, and in accordance with an embodiment, the case 100 can be reversible such that each tool holder 102 can be coupled with either of the first or second components 104 or 106. In an embodiment, the case 100 can receive a plurality of tool holders 102. Some of the plurality of tool holders 102 can be received in the first component 104 and others of the plurality of tool holders 102 can be received in the second component 106. Both the first and second components 104 and 106 can include engagement structures 122, and more particularly sets of engagement structures 122, that interface with the tool holder(s) 102 to couple the tool holder(s) 102 to the case 100. In an embodiment, the engagement structures 122 in the second component 106 can have any one or more similar characteristics or attributes as described above with respect to the engagement structures 122 of the first component 104. For example, the engagement structures 122 can share a common size and a common shape. In another embodiment, the engagement structures 122 in the second component 106 can have any one or more dissimilar characteristics or attributes as described above with respect to the engagement structures 122 of the first component 104. For example, the engagement structures 122 can all be arranged in a single region. That is, the second component 106 may not be split into a plurality of different regions like the first component 104.

Figure 4:
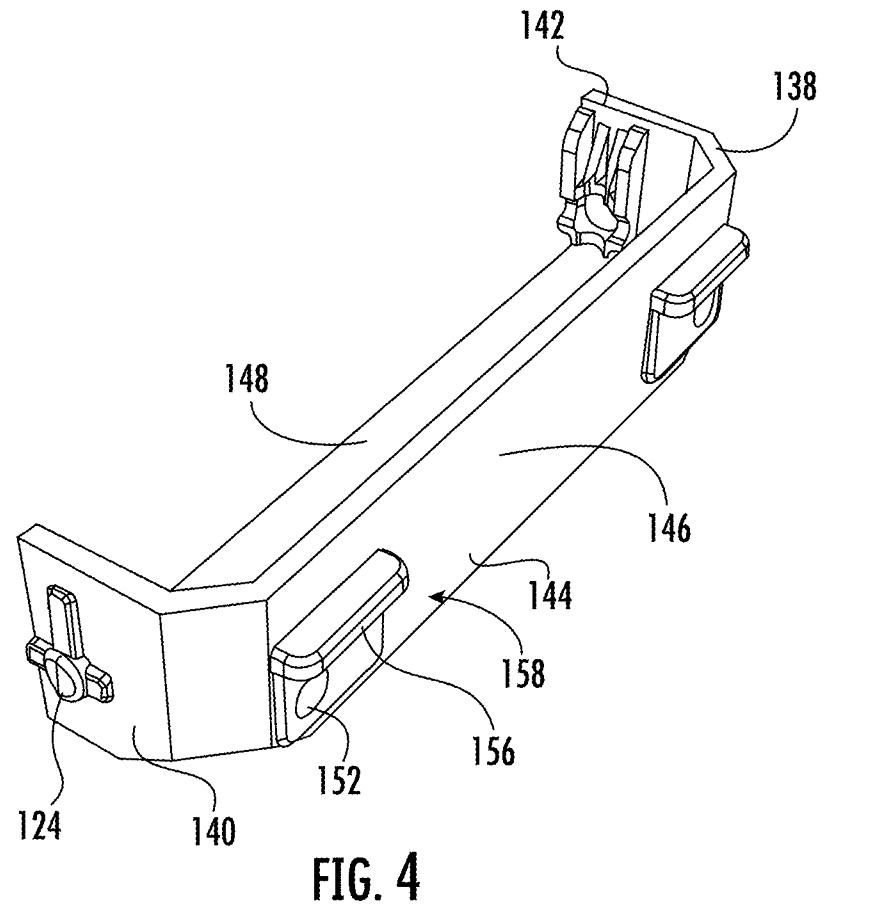
FIG. 4 is a rear perspective view of a tool holder in accordance with embodiments of the present disclosure.
Figure 5:
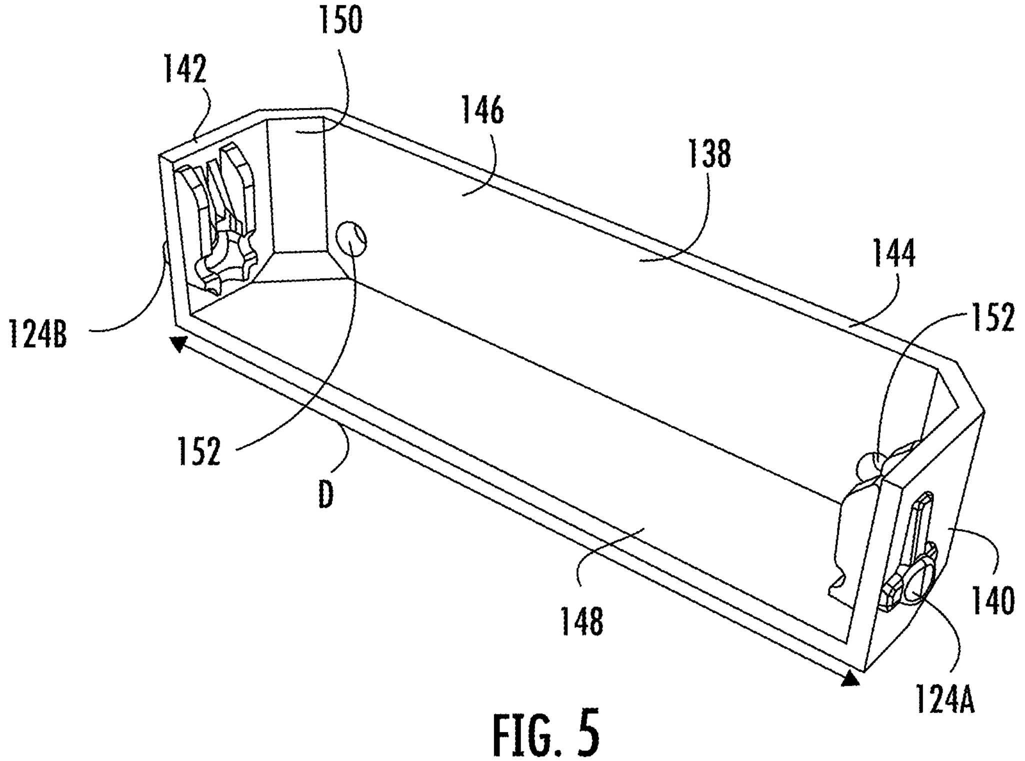
FIG. 5 is a front perspective view of the tool holder in accordance with embodiments of the present disclosure.

The tool holder 102 depicted in FIGS. 4 and 5 may be configured to fit in either of the first or second regions 132 or 134 of the case 100 based on a size of the tool holder 102. More particularly, the tool holder 102 may be configured to fit in either of the first or second regions 132 or 134 of the case 100 based on a distance D between a first complementary engagement structure 124A and a second complementary engagement structure 124B.

Figure 24:
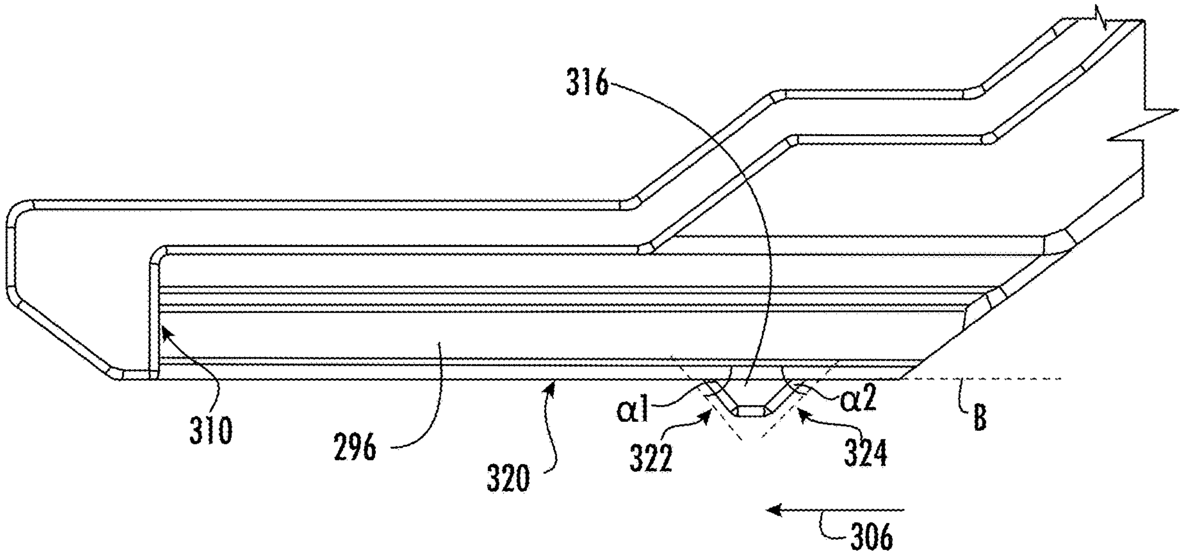
FIG. 24 is a top view of a portion of the accessory mounting platform in accordance with embodiments of the present disclosure.

The tool holder 102 can generally include a body 138 defining opposite sidewalls 140 and 142 and an elongated member 144 extending between the opposite sidewalls 140 and 142. In an embodiment, the elongated member 144 can include a back 146 and a bottom 148. The back 146 and bottom 148 can meet at a generally 90° angle. The back and bottom 146 and 148 extend between and connect the opposite sidewalls 140 and 142. In some instances, at least one of the back and bottom 146 and 148 can be coupled to at least one of the sidewalls 140 and 142 through a chamfer 150, a fillet, or another interfacing segment of the body 138. As depicted in FIG. 24, the tool holder 102 may include an elongated member 144 with only a back 146. Alternatively, the tool holder 102 may include an elongated member 144 with only a bottom 148.

The body 138 can include structure to allow for engagement with an object, such as a power tool, e.g., a drill. By way of non-limiting example, the structure can include one or more openings 153 each configured to receive a fastener that couples the tool holder 102 to a drill 154 (see FIG. 19). The fasteners can be threaded fastener which extend through the openings and mate with threads on the drill 154, non-threaded fasteners which engage with structure of the drill 154, integral portions, e.g., posts, of the drill 154 that extend from the drill and insert into the openings 153, other suitable fastening elements, or any combination thereof. By way of other non-limiting examples, the structure for engaging the body 138 relative to an object, such as the drill 154, can include snap fits, hook and loop fasteners, hooks or clips, posts which engage with openings of the drill 154, or the like. The body 138 can further include a support 156, such as a flange extending from a back surface 158 of the body 138, configured to interface with the object, such as the drill 154, and support the tool holder 102 relative therewith.

Figure 6:
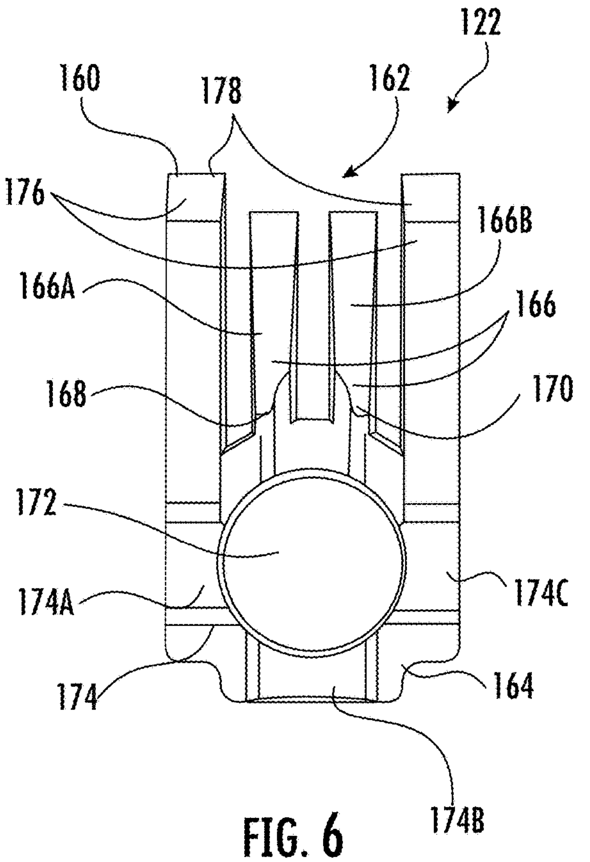
FIG. 6 is a front view of an engagement structure of the case in accordance with embodiments of the present disclosure.
Figure 7:
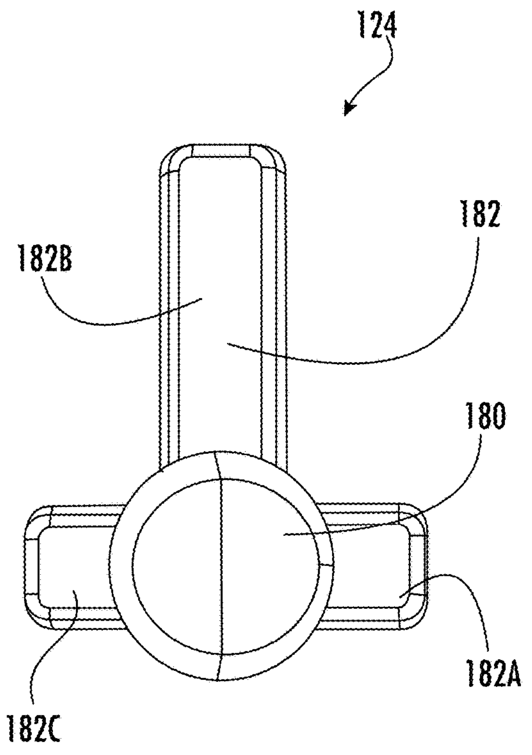
FIG. 7 is a front view of a complementary engagement structure of the tool holder in accordance with embodiments of the present disclosure.

FIGS. 6 and 7 illustrate views of the engagement structure 122 and complementary engagement structure 124 in accordance with an embodiment. In particular, FIG. 6 illustrates the engagement structure 122 and FIG. 7 illustrates the complementary engagement structure 124.

Referring initially to FIG. 6, the engagement structure 122 can include a proximal end 160 defining an entrance 162 and a distal end 164 opposite the proximal end 160. A ramp 166 can extend from the proximal end 160 towards the distal end 164. The ramp 166 can define an inclined profile which rises towards the distal end 164 of the engagement structure 122. In certain instances, the ramp 166 can include a plurality of ramp segments, such as segments 166A and 166B. Distal ends 168 of the ramp segments 166A and 166B can define guide surfaces 170 which facilitate entrance of the complementary engagement structure 124 into a pocket 172 of the engagement structure 122. The engagement structure 122 can further include orientation features 174 configured to orient the complementary engagement structure 124 relative to the engagement structure 122 and maintain the complementary engagement structure 124 in the oriented position. The orientation features 174 depicted in FIG. 6 include a first orientation feature 174A, a second orientation feature 174B and a third orientation feature 174C each rotationally offset from an adjacent orientation feature by 90°. Other rotational orientations of the orientation features 174 are possible. Guide walls 176 can guide the complementary engagement structure 124 over the ramp 166 and into the pocket 172. In an embodiment, the guide walls 176 can each define outer lateral aspects of the engagement structure 122. In certain instances, a distance between the guide walls 176 can generally correspond to a diameter of the pocket 172. A leading end of the guide walls 176 can include a ramped portion 178.

As illustrated in FIG. 7, the complementary engagement structure 124 can include a head 180 and alignment features 182. The head 180 can define a size and shape configured to fit at least partially within the pocket 172 of the engagement structure 122. The alignment features 182 can project outward from the head 180. In an embodiment, the alignment features 182 includes a plurality of alignment features, such as a first alignment feature 182A, a second alignment feature 182B and a third alignment feature 182C. In an embodiment, the first and third alignment features 182A and 182C can have a same size as one another and the second alignment feature 182B can have a different size. For example, the second alignment feature 182B can be longer than the first and second alignment features 182A and 182C. In an embodiment, the first, second and third alignment features 182A, 182B and 182C can be rotationally offset from one another by 90°. The relative angular orientation of the alignment features 182 can match the angular orientation of the orientation features 174. When the complementary engagement feature 124 is installed in the engagement feature 122, the alignment features 182 can align with the orientation features 174. More particularly, the first alignment feature 182A can align with the first orientation feature 174A, the second alignment feature 182B can align with the second orientation feature 174B, and the third alignment feature 182C can align with the third orientation feature 174C.

To install the complementary engagement feature 124 in the engagement feature 122, the head 180 can be introduced to the entrance 162 and slid towards the distal end 164. After reaching the distal end 168 of the ramp 166, the head 180 can push outward into the pocket 172 and be retained therein by sidewalls of the pocket 172. In an embodiment, tactile or audible indication of seating between the complementary engagement feature 124 and engagement feature 122 can occur when the head 180 snaps into the pocket 172. Rotational alignment between the complementary engagement feature 124 and the engagement feature 122 is maintained through the interface between the alignment features 182 and the orientation features 174.

To remove the complementary engagement feature 124 from the engagement feature 122, the complementary engagement feature 124 is translated away from the pocket 172, towards the entrance 162. After passing the head 180 by the distal end 168 of the ramp 166, the complementary engagement feature 124 can move towards the proximal end 160 of the engagement feature 122 at least partially under force generated by the incline of the ramp 166. In some instances, such force between the head 180 and the ramp 166 can cause the complementary engagement feature 124 to accelerate out of the engagement feature 122. This may be perceived by the user as a snap or positive disengagement indicating detachment between the complementary engagement feature 124 and the engagement feature 122.

Figure 8:
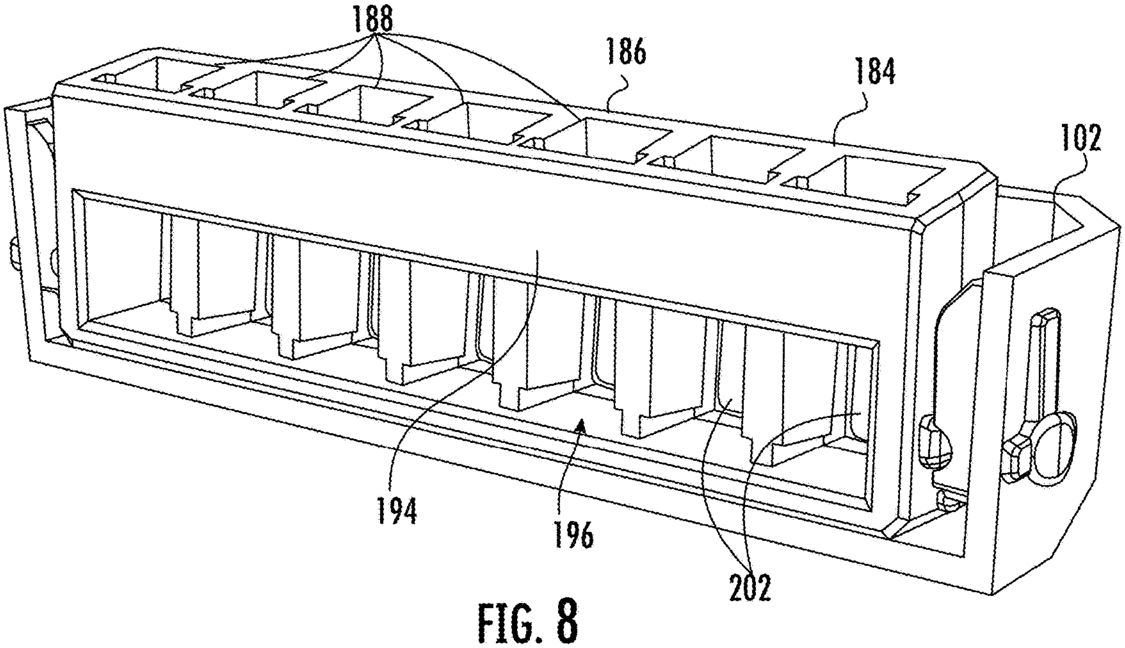
FIG. 8 is a perspective view of a bit holder coupled to the tool holder in accordance with embodiments of the present disclosure.
Figure 9:
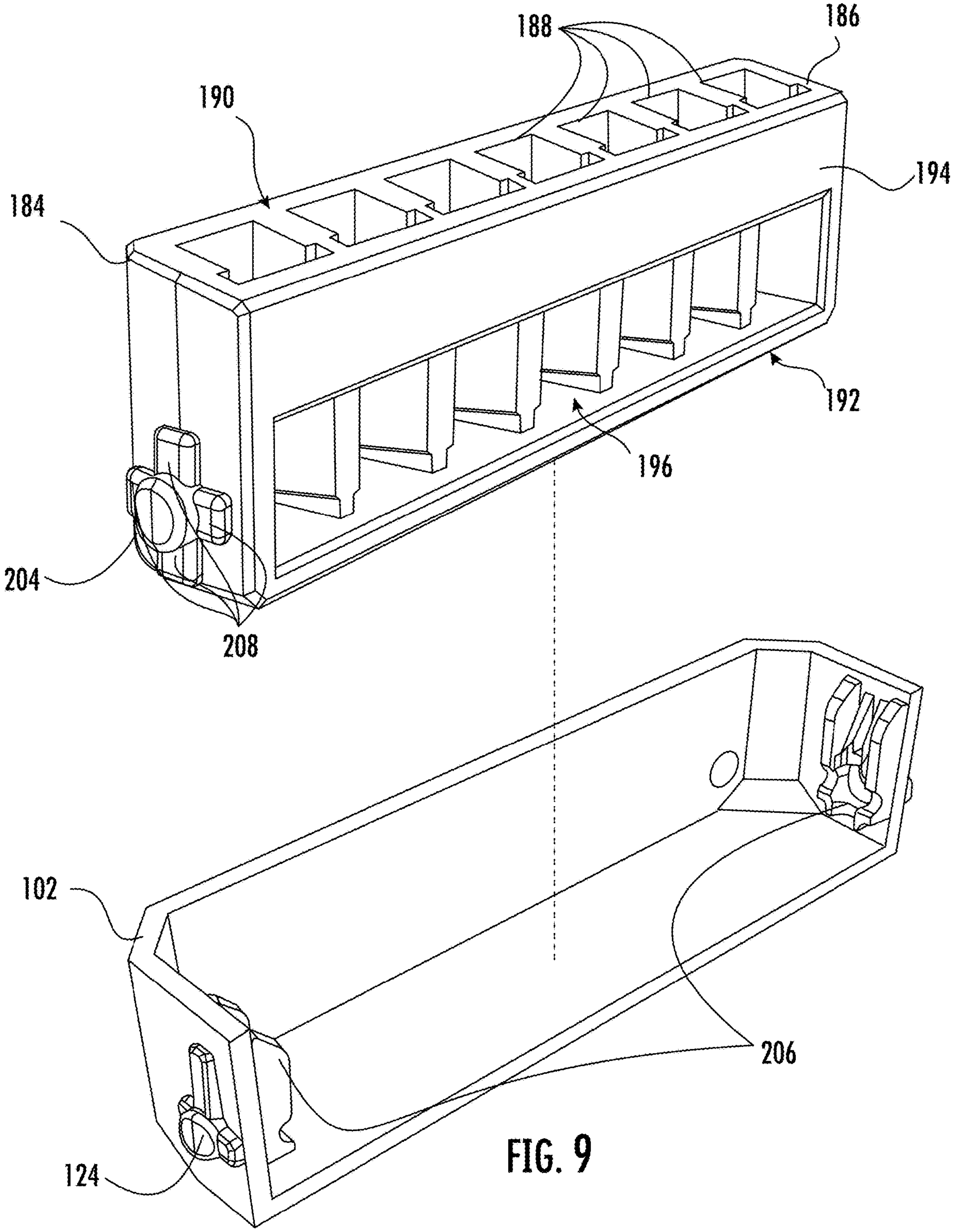
FIG. 9 is an exploded view of the bit holder and the tool holder in accordance with embodiments of the present disclosure.
Figure 10:
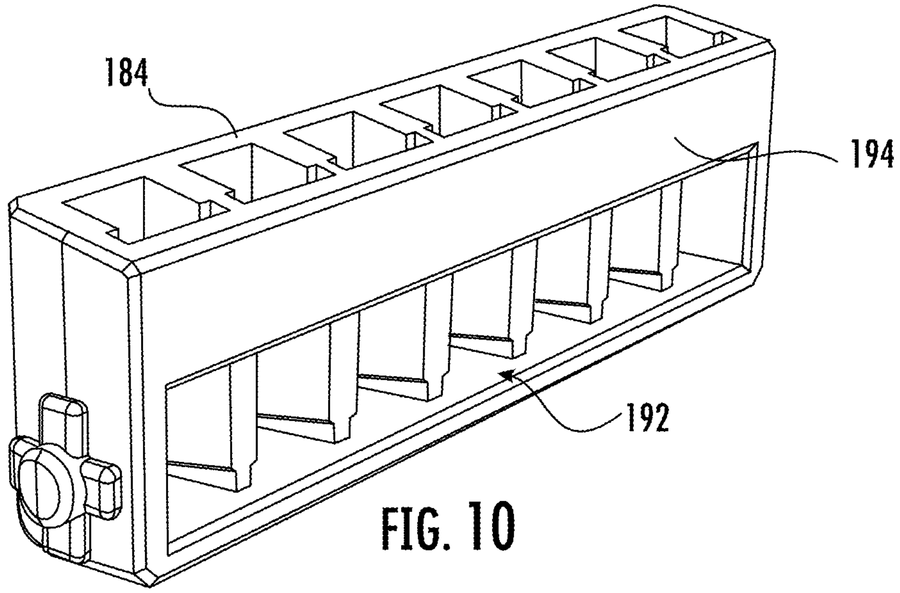
FIG. 10 is a front perspective view of the bit holder in accordance with embodiments of the present disclosure.
Figure 11:
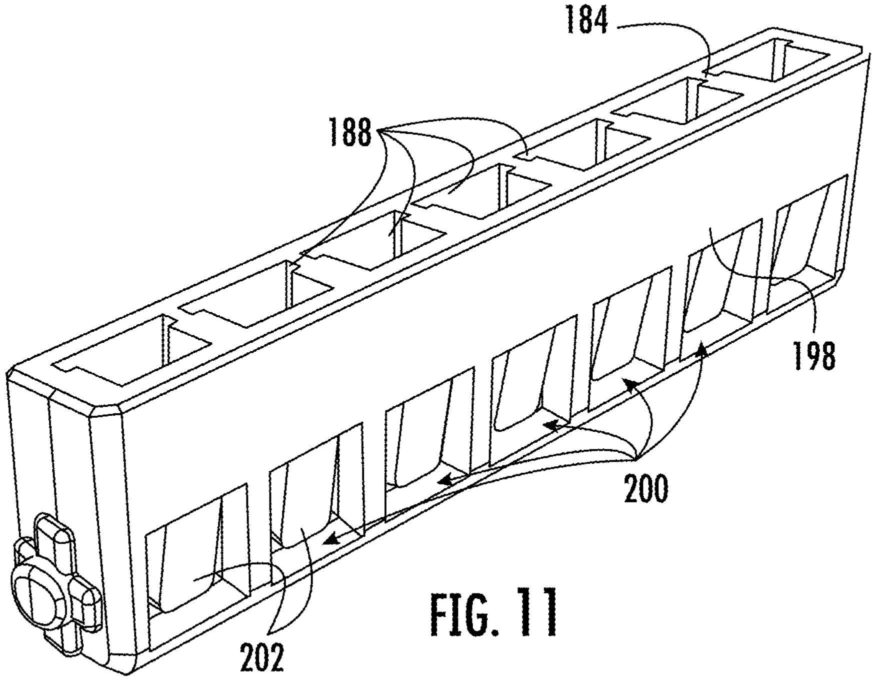
FIG. 11 is a rear perspective view of the bit holder in accordance with embodiments of the present disclosure.
Figure 12:
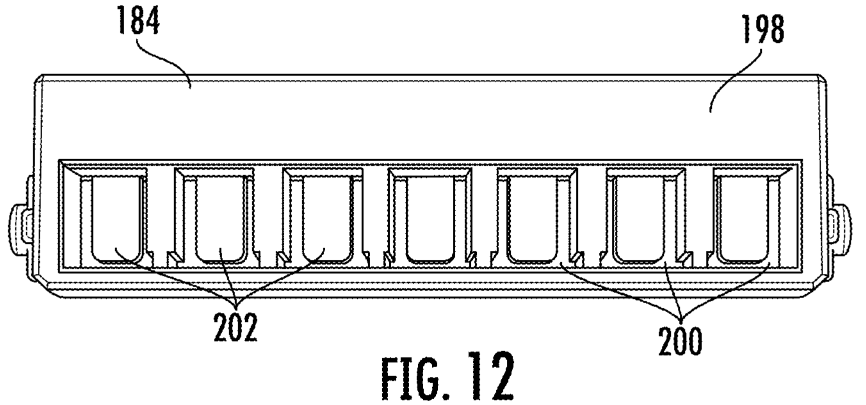
FIG. 12 is a front view of the bit holder in accordance with embodiments of the present disclosure.
Figure 13:
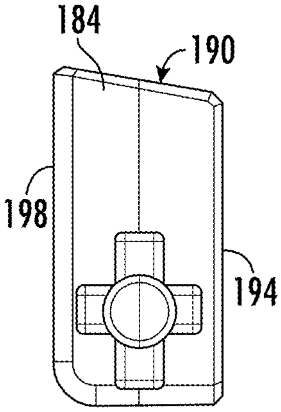
FIG. 13 is a front view of the bit holder in accordance with embodiments of the present disclosure.
Figure 14:
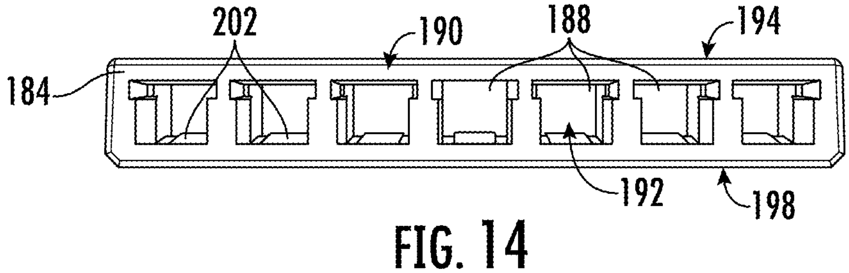
FIG. 14 is a top view of the bit holder in accordance with embodiments of the present disclosure.
Figure 19:
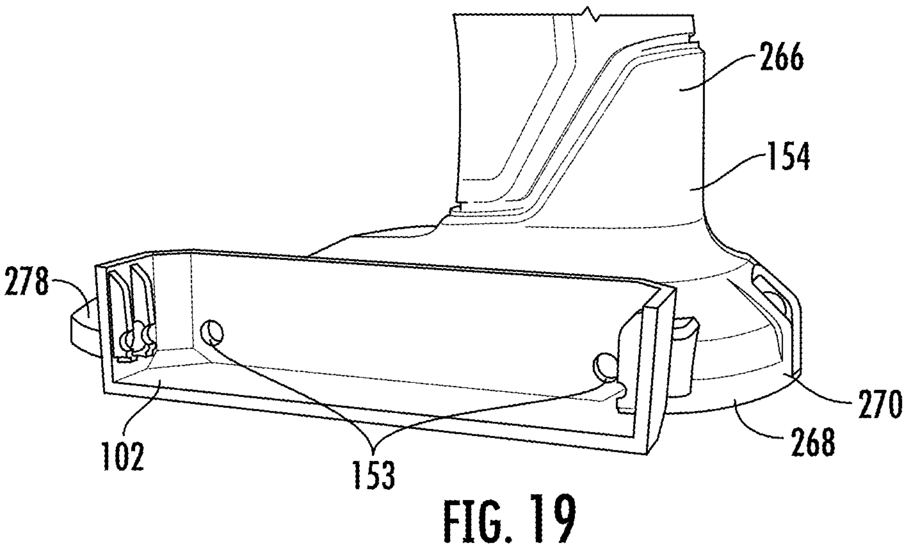
FIG. 19 is a rear perspective view of a portion of a drill including a tool holder in accordance with embodiments of the present disclosure.
Figure 20:
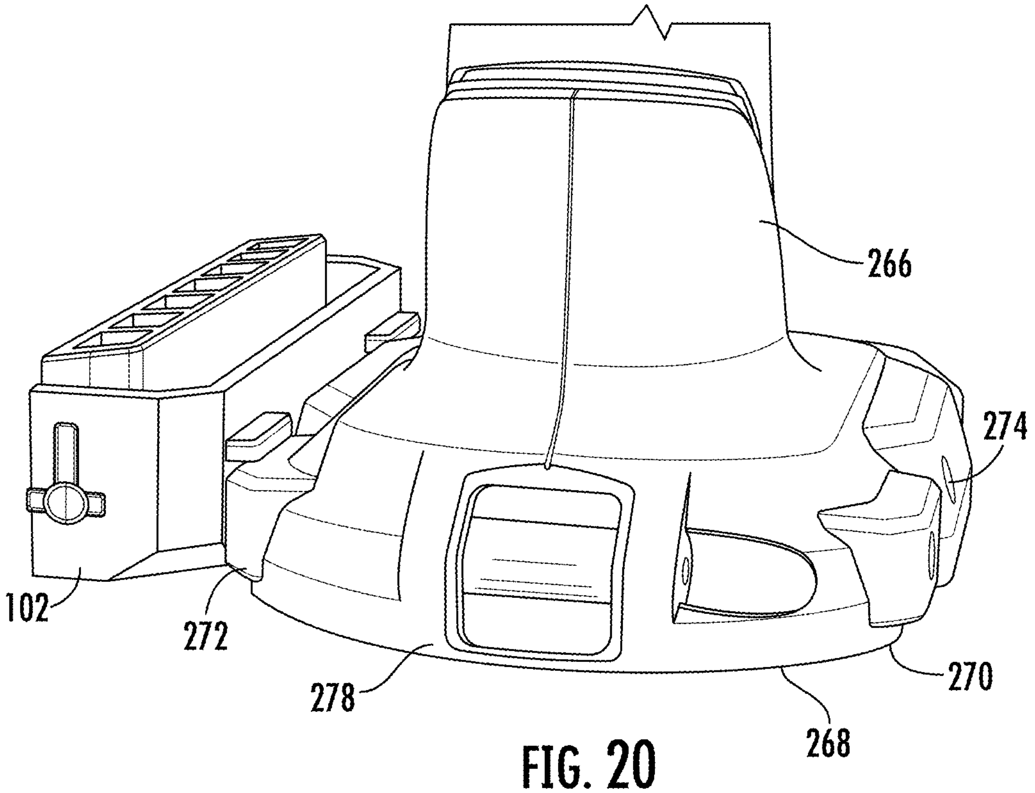
FIG. 20 is a rear view of a portion of a drill including a tool holder and a bit holder in accordance with embodiments of the present disclosure.
Figure 21:
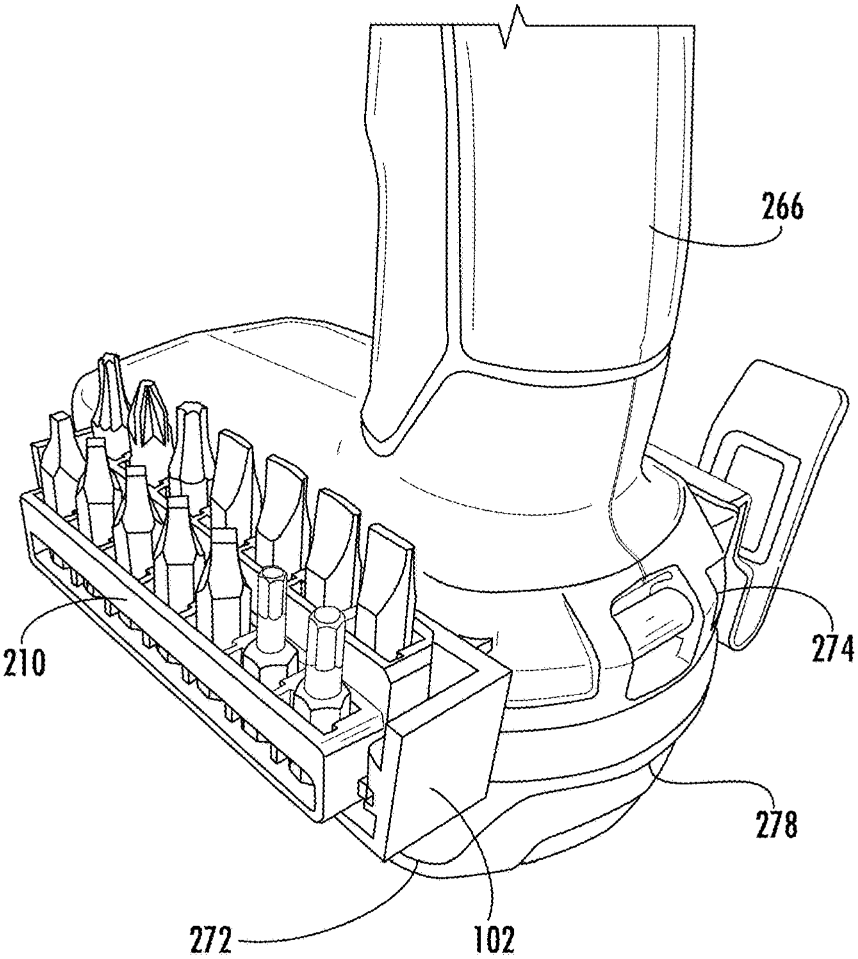
FIG. 21 is a rear perspective view of a portion of a drill including a tool holder and a multi-row bit holder in accordance with embodiments of the present disclosure.
Figure 22:
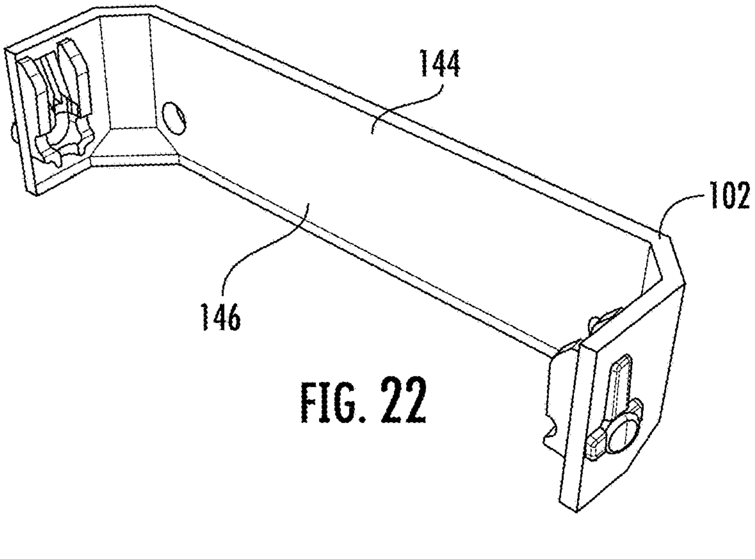
FIG. 22 is a perspective view of a tool holder in accordance with embodiments of the present disclosure.

FIG. 8 illustrates a view of a bit holder 184 interfaced with the tool holder 102 in accordance with an embodiment. The bit holder 184 is an example of an element which can be interfaced with the tool holder 102. The bit holder 184 includes a body 186 defining a plurality of bit storage spaces 188 each configured to receive a bit for use with the drill 154 (FIG. 19). FIG. 9 illustrates the tool holder 102 and bit holder 184 as seen detached from one another. FIGS. 10 to 14 illustrate the bit holder 184 in accordance with an embodiment. In particular, FIG. 10 illustrates a front perspective view of the bit holder 184, FIG. 11 illustrates a rear perspective view of the bit holder 184, FIG. 12 is a rear view of the bit holder 184, FIG. 13 is a side view of the bit holder 184, and FIG. 14 is a top view of the bit holder 184.

Referring to FIGS. 8 to 14, the bit storage spaces 188 can enter the body 186 from a top surface 190 of the body 186 and extend towards a bottom surface 192 of the body 186. In an embodiment, the bit storage spaces 188 can be open along a front side 194 of the body 186. More particularly, one or more windows 196 can extend through the front side 194 of the body 186 to expose portions of drill bits contained in each of the bit storage spaces 188. In another embodiment, the bit storage spaces 188 can be open along a rear side 198 of the body 186. More particularly, one or more windows 200 can extend through the rear side 198 of the body 186 to expose portions of drill bits contained in each of the bit storage spaces 188. In an embodiment, the window 196 can include a common opening in the front side 194 of the body 186 which communicates with each of the bit storage spaces 188 and the windows 200 can include separate openings in the rear side 198 of the body 186 each communicating with a different bit storage space 188. Windows 196 and 200 may allow for inspection of drill bits, swarf extraction, and cooling air to reach hot drill bits. In an embodiment, the bottom surface 192 of the bit storage spaces 188 can be canted relative to the direction of insertion of the drill bit into the bit storage space 188. For example, the bottom surface 192 can slope towards the front side 194 of the body 186. In certain instances, the sloped surface can increase swarf extraction and prevent swarf buildup.

In an embodiment, tines 202 can be disposed at one or more of the bit storage space 188. The tines 202 can project into the bit storage spaces 188 and provide biasing pressure against drill bits inserted therein. In this regard, the tines 202 can stabilize the drill bits and prevent wobble and movement thereof. This can reduce rattle and improve user experience and perceived quality of construction.

Referring to FIG. 9, the bit holder 184 can include a complementary engagement structure 204 that interfaces with engagement structure 206 of the tool holder 102. In an embodiment, the complementary engagement structure 204 can share any one or more characteristics or features as compared to the complementary engagement structure 124. Moreover, the engagement structure 206 can share any one or more characteristics or features as compared to the engagement structure 122. In another embodiment, the complementary engagement structure 204 can have one or more dissimilar characteristics or features as compared to the complementary engagement structure 124. Moreover, the engagement structure 206 can have one or more dissimilar characteristics or features as compared to the engagement structure 122. For example, the complementary engagement structure 204 includes four alignment features 208 while the complementary engagement structure 124 includes only three alignment features. Moreover, the alignment features 208 can all share a common size and shape.

Figure 15:
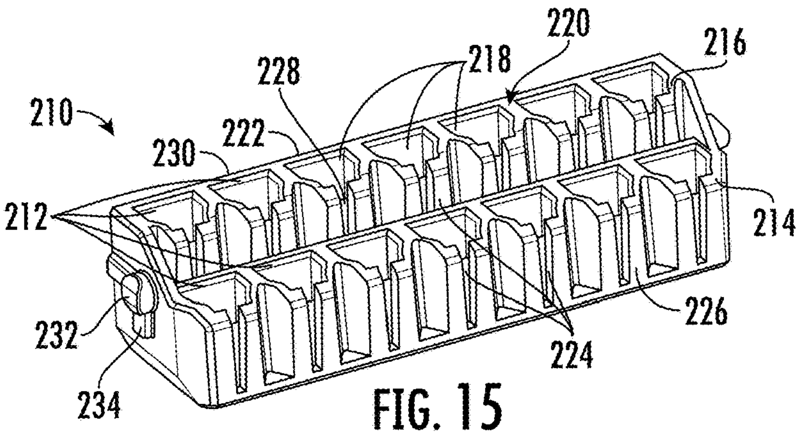
FIG. 15 is a perspective view of a multi-row bit holder in accordance with embodiments of the present disclosure.
Figure 16:
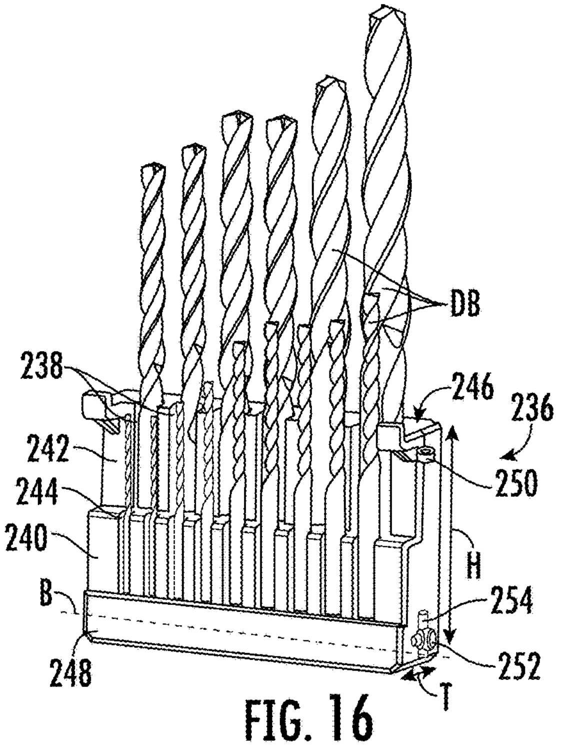
FIG. 16 is a perspective view of a multi-row bit holder in accordance with embodiments of the present disclosure.
Figure 17:
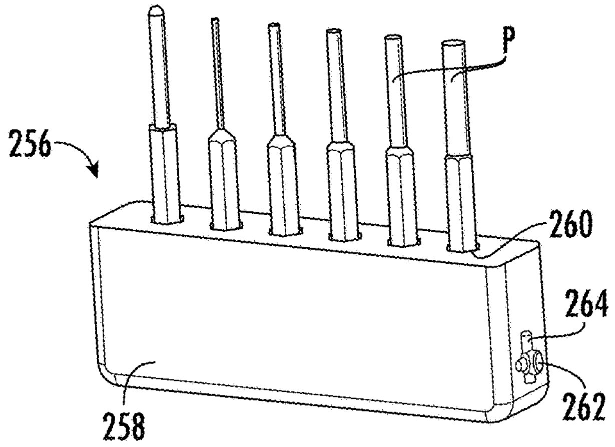
FIG. 17 is a perspective view of a tool holder in accordance with embodiments of the present disclosure.
Figure 18:
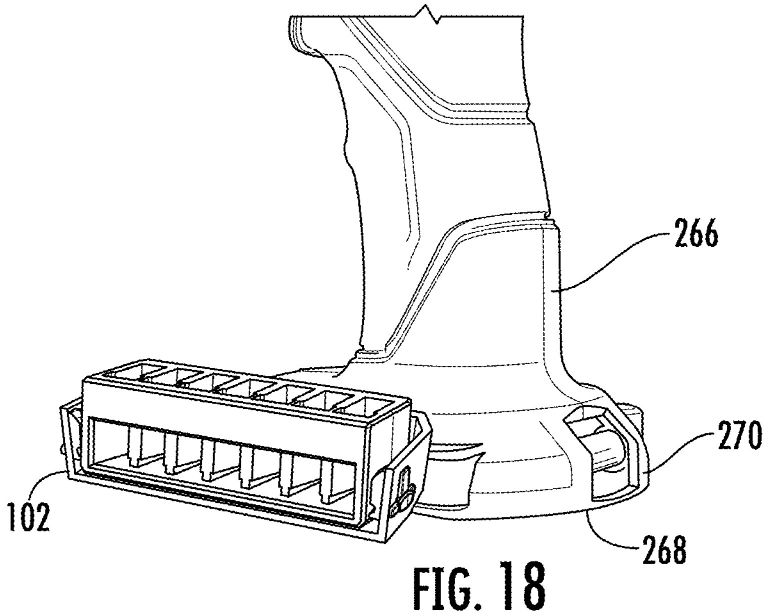
FIG. 18 is a rear perspective view of a portion of a drill including a tool holder and a bit holder in accordance with embodiments of the present disclosure.

FIGS. 15 to 17 illustrate bit holders in accordance with other embodiments. FIG. 15 illustrates a multi-row bit holder 210 in accordance with an embodiment. The multi-row bit holder 210 includes two rows of bit storage spaces 212, including a first row 214 and a second row 216. The first row 214 is disposed at a vertical elevation below the second row 216. Drill bits and other tools inserted into the second row 216 are thus disposed at a higher relative location and can be easily viewed and accessed from behind the first row 214. The bit storage spaces 212 are defined by openings 218 extending from a top surface 220 into a body 222 of the multi-row bit holder 210. Due to the multi-tiered bit storage spaces 212, the top surface 220 can define a multi-terraced arrangement. Slots 224 can extend downward from the openings 218 along a front side 226 of the body 222. The slots 224, similar to the windows 196 and 200, can permit inspection of drill bits, swarf extraction, and cooling air to reach hot drill bits. In an embodiment, windows 228 can be disposed opposite the slots 224 on a rear side 230 of the body 222. The multi-row bit holder 210 can include a complementary engagement structure 232 to interface with the aforementioned engagement structure 206 of the tool holder 102, or even the engagement structure 122 of the case 100. The complementary engagement structure 232 can include a plurality of alignment features 234, such as two alignment features 234.

FIG. 16 illustrates a tall multi-row bit holder 236 having a height H significantly larger than a thickness T. The multi-row bit holder 236 includes bit storage spaces 238 with open fronts to permit rotational displacement of drill bits B. The bit storage spaces 238 are arranged in a plurality of rows, including a first row 240 and a second row 242. The first row 240 is disposed at a vertical elevation below the second row 242. Drill bits and other tools inserted into the second row 242 are thus disposed at a higher relative location and can be easily viewed and accessed from behind the first row 240. The bit storage spaces 238 are defined by openings 244 extending from a top surface 246 into a body 248 of the multi-row bit holder 236. Due to the multi-tiered bit storage spaces 238, the top surface 246 can define a multi-terraced arrangement. In some instances, the first and second rows 240 and 242 can be moveable relative to one another. For instance, the first and second rows 240 and 242 can pivot relative to one another about a rotational axis B. A lock 250 can selectively retain the first and second rows 240 and 242 together. The multi-row bit holder 236 can include a complementary engagement structure 252 to interface with the aforementioned engagement structure 206 of the tool holder 102, or even the engagement structure 122 of the case 100. The complementary engagement structure 252 can include a plurality of alignment features 254, such as two alignment features 254.

FIG. 17 illustrates a tool holder 256 in accordance with an embodiment. The tool holder 256 can include a body 258 defining openings 260 that each receive a tool, such as a punch P. The tool holder 256 can include a complementary engagement structure 262 to interface with the aforementioned engagement structure 206 of the tool holder 102, or even the engagement structure 122 of the case 100. The complementary engagement structure 262 can include a plurality of alignment features 264, such as two alignment features 264.

FIGS. 18 to 21 illustrate the tool holder 102 coupled to a tool in accordance with an illustrative embodiment. More particularly, FIGS. 18 to 21 illustrate the tool holder 102 coupled to a drill 154. The drill 154 depicted in FIGS. 18 to 21 includes a handle 266 with a battery receiving area 268 disposed at a distal end 270. The tool holder 102 can be coupled to the drill 152 along the handle 266. More particularly, the tool holder 102 can be coupled to the handle 266 at or adjacent to the distal end 270. The drill 152 can define opposite lateral sides 272 and 274, a front side 276 and a rear side 278. In an embodiment, the tool holder 102 can be disposed adjacent to one of the lateral sides 272 or 274. In some instances, the tool holder 102 may be mountable at only a single location along the drill 154. For example, the tool holder 102 may be mountable along the lateral side 272. In other instances, the tool holder 102 may be selectively mounted at one of a plurality of locations along the drill 154. For example, the tool holder 102 may be mountable at the lateral side 272 or the lateral side 274. The user may select an ergonomic arrangement, e.g., dependent on whether the user is left handed or right handed, dependent upon a type of operation to be performed, dependent upon a type of tool being carried, dependent upon a condition associated with the work environment, or the like. In this regard, the tool holder 102 may be multi-positional relative to the object, e.g., the drill 154.

Figure 23:
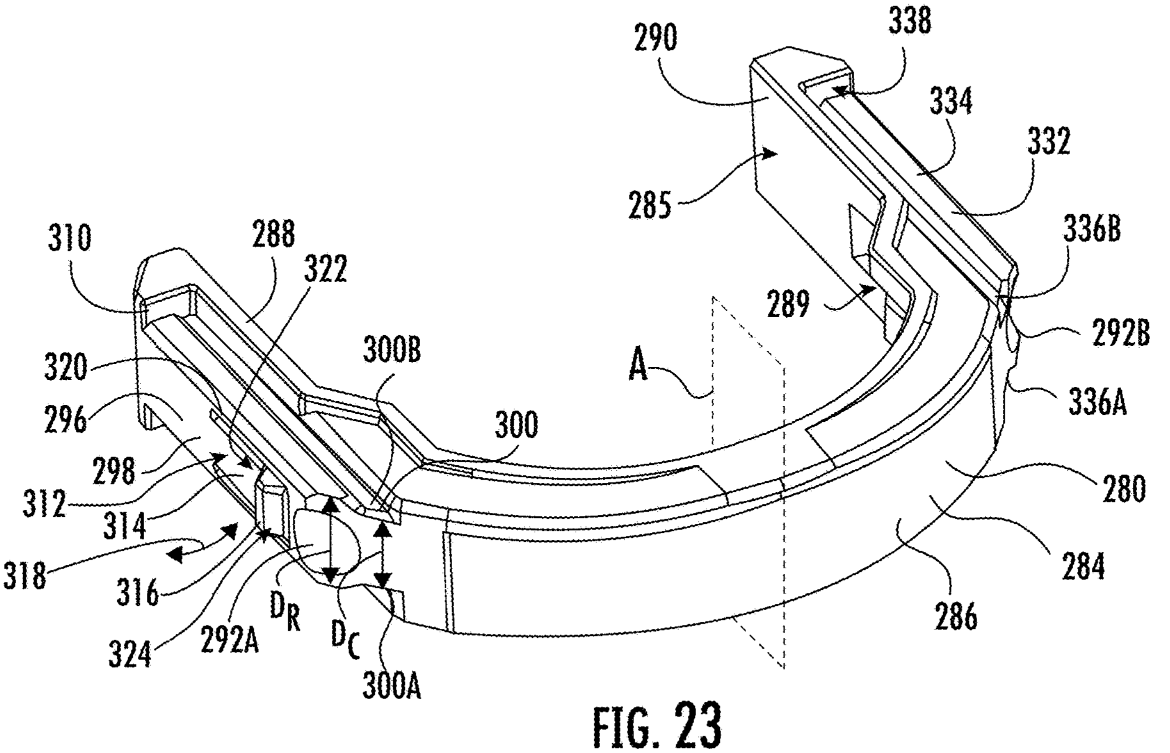
FIG. 23 is a perspective view of an accessory mounting platform in accordance with embodiments of the present disclosure.
Figure 25:
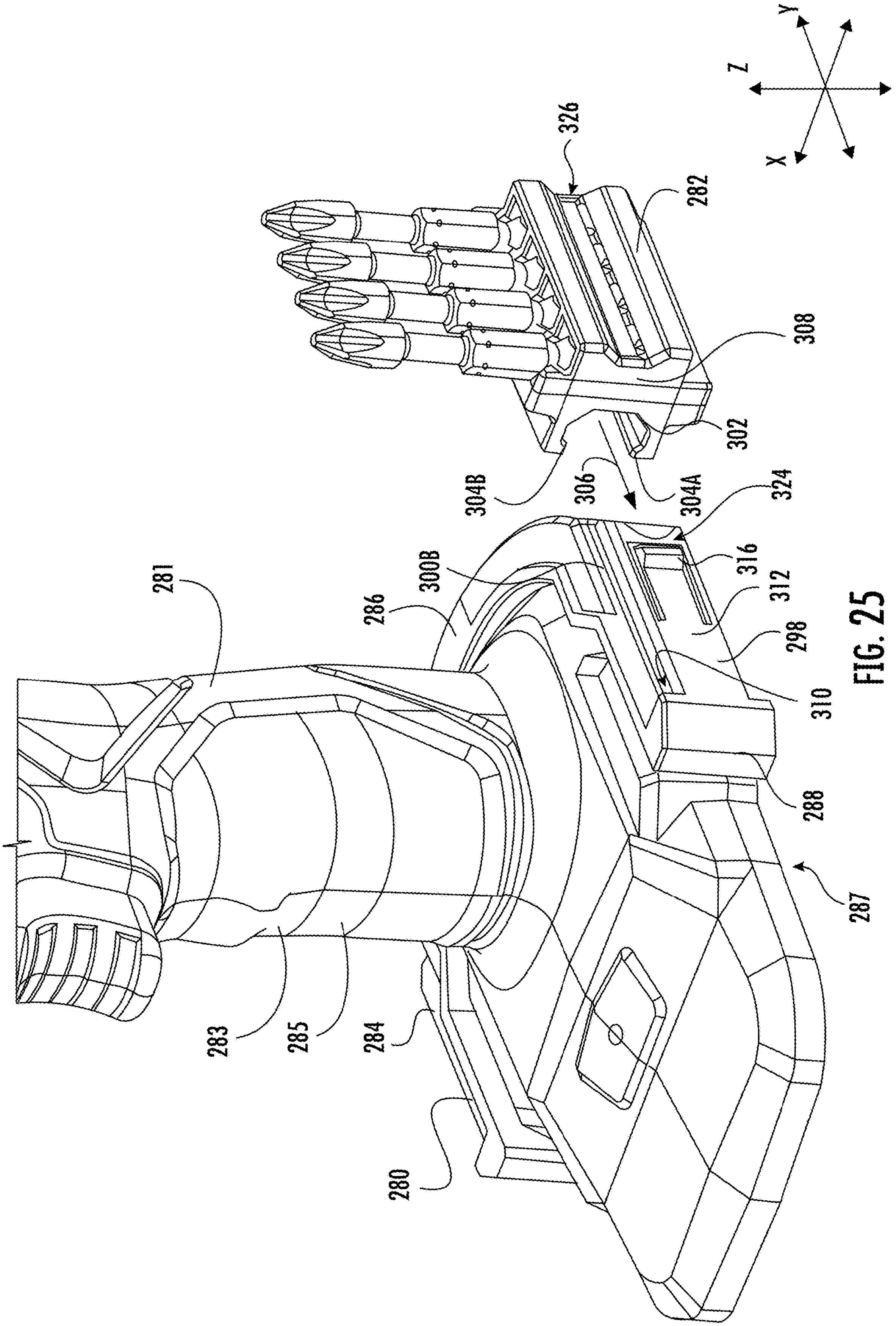
FIG. 25 is a perspective view of a portion of a power tool including the accessory mounting platform and an accessory aligned to be coupled with the accessory mounting platform in accordance with embodiments of the present disclosure.

FIG. 23 illustrates an accessory mounting platform 280 in accordance with an embodiment. The accessory mounting platform 280 can form an interface between an accessory and a power tool, such as a handheld power tool, to selectively couple the accessory to the power tool. FIG. 24 depicts a top view of a portion of the accessory mounting platform 280 in accordance with an embodiment. FIG. 25 illustrates the accessory mounting platform 280 coupled with a power tool 281 and an accessory 282 aligned with the accessory mounting platform 280 ready to be coupled therewith.

Referring to FIGS. 23 to 25, the accessory mounting platform 280 includes a body 284 that is sized and shaped to be coupled with the power tool 281. The body 284 can be compatible with, e.g., sized and shaped to fit on, a plurality of different handheld power tools such as drills, drivers, impact drivers, ratchet wrenches, oscillating tools, polishers, caulk guns, flashlights, saws, and cut-out tools. The accessory mounting platform 280 can fit on a tool body 283 of the power tool 281 and extend around at least a portion of the tool body 283. In an embodiment, the accessory mounting platform 280 is disposed between a handle 285 of the tool body 283 and a battery receiving area 287 of the tool body 283. In an embodiment, the accessory mounting platform 280 can be coupled flush to the tool body 283 at the battery receiving area 287. In another embodiment, the accessory mounting platform 280 can extend past the tool body 283 (proud) or terminate prior to an end surface of the tool body 283. In some instances, the accessory mounting platform 280 can form a support surface for the power tool 281, supporting the weight of the power tool 281 and balancing the power tool 281 when engaged therewith.

In an embodiment, the body 284 includes a central segment 286 with first and second segments 288 and 290 extending from opposite ends of the central segment 286. The first and second segments 288 and 290 can extend from the central segment 286 in the same, or generally same, direction as one another. In an embodiment, the first and second segments 288 and 290 can be reflectively symmetrical with one another about a plane A bisecting the central segment 286. In an embodiment, the central segment 286 and the first and second segments 288 and 290 can form a generally U-shaped body that is configured to extend around at least a portion of the power tool 281. The body 284 can be formed from a rigid material such as a polymer, a metal, an alloy, or the like using one or more manufacturing processes such as injection molding, roto-molding, casting, additive manufacturing, die stamping, milling, or the like. In an embodiment, the body 284 can have a single-piece construction (unitary). In another embodiment, the body 284 can include multiple pieces coupled together.

The accessory mounting platform 280 can be removably coupled to the power tool 281 through a detachable interface. In an embodiment, the body 284 includes one or more opening 292 through which a threaded or non-threaded fastener (not illustrated) can extend to removably couple the accessory mounting platform 280 to the power tool. In the illustrated embodiment, the body 284 includes a first opening 292A disposed on the first segment 288 and a second opening 292B disposed on the second segment 290. In another embodiment, the detachable interface can include a different type of detachable interface for engaging with the power tool 281, such as a snap-fit formed between the accessory mounting platform 280 and the power tool 281, a bayonet-type connection, an adhesive or taped connection, one or more snaps or buckles, an integrated bolt or fastener that is part of the accessory mounting platform 280 that interfaces with the power tool 281, or the like. While the accessory mounting platform 280 is removable from the power tool 281, some operators may use the power tool 281 with the accessory mounting platform 280 attached to the power tool 281 at all times.

In an embodiment, the body 284 includes an inner surface 285 configured to be disposed immediately adjacent to the power tool 281. The inner surface 285 can have a shape or feature configured to interact with a surface of the power tool 281 to further secure the accessory mounting platform 280 to the power tool 281. By way of non-limiting example, the accessory mounting platform 280 can include an engagement surface 289 (e.g., a mated surface, a lip, a channel, a groove, etc.) configured to seat on a correspondingly shaped reference surface or feature (not illustrated) of the power tool 281. The engagement surface 289 and reference surface or feature can interact with one another to maintain a relatively fixed angular orientation of the accessory mounting platform 280 relative to the power tool 281 when the accessory mounting platform 280 is coupled therewith. In embodiments where the openings 292A and 292B are coaxially aligned with one another, interaction between the engagement surface 289 and the reference surface or feature of the power tool 281 can prevent camming or rotation of the body 284 about the axis of the openings 292A and 292B.

The accessory mounting platform 280 is configured to removably receive an accessory 282 and couple the accessory 282 to the power tool 281. In an embodiment, the first segment 288 includes an engagement structure that removably interfaces with the accessory 282. The engagement structure can include a rail 296 configured to receive the accessory 282. The rail 296 can be disposed along a lateral aspect of the first segment 288, such as along an outer side of the accessory mounting platform 280. The rail 296 can include a rail head 298 and at least one channel 300 disposed adjacent to the rail head 298. In an embodiment, the channel 300 includes a first channel 300A disposed on a first side of the rail head 298 and a second channel 300B disposed on a second (opposite) side of the rail head 298. A distance Dc between the first and second channels 300A and 300B can be less than a dimension DR of the rail head 298, as measured in a direction parallel with the distance Dc.

The accessory 282 includes a groove 302 having a size and shape corresponding to the size and shape of the rail head 298. The groove 302 can have first and second terminating ends 304A and 304B that interface with the first and second channels 300A and 300B, respectively. After aligning the groove 302 of the accessory 282 with the rail head 298 of the accessory mounting platform 280, the accessory 282 is translated (e.g., slid) in a direction 306 along the rail head 298 until a leading end 308 of the accessory 282 contacts a stop feature 310 of the accessory mounting platform 280. In an embodiment, the stop feature 310 can be a surface disposed at a distal end of the rail 296. In an embodiment, the accessory 282 can remain attached to the rail 296 of the accessory mounting platform 280 by a frictional fit or interference fit between the accessory 282 and the rail 296. However, in other embodiments, the accessory 282 can be locked to the rail 296 to mitigate movement therebetween.

As the accessory 282 contacts, or is near contacting, the stop feature 310, a locking component 312 can move to a locked position to capture the accessory 282 on the rail 296. In an embodiment, the locking component 312 can move to the locked position to capture the accessory 282 simultaneously with the accessory 282 contacting the stop feature 310. In an embodiment, the locking component 312 may automatically lock the accessory 282 to the rail 296. Automatic locking is intended to refer to scenarios where the accessory 282 is locked to the rail 296 without requiring an operator to directly interact with the locking component 312 to lock the accessory 282 to the rail 296. Instead, the operator indirectly interacts with the locking component 312, e.g., through the accessory 282. In another embodiment, the locking component 312 may require an operator to interact directly with the locking component 312 during one or more installation steps to lock or unlock the locking component 312.

In an embodiment, the locking component 312 may be associated with, such as be part of the rail 296. For example, the locking component 312 can be disposed on the rail head 298. In an embodiment, the locking component 312 includes an arm 314 at least partially detached from a neighboring sidewall portion 320 of the rail head 298 and a tab 316 arranged distally on the arm 314. A proximal end of the arm 314 can be integral with the neighboring sidewall portion 320 of the rail head 298. The arm 314 can flex at the proximal end in either direction 318 when force is applied to the arm 314 or the tab 316, such as when the accessory 282 is being installed on and removed from the rail 296.

In an embodiment, the tab 316 extends from an outer side of the arm 314. The tab 316 includes a locking surface 322 and an unlocking surface 324. The locking surface 322 can be disposed between the unlocking surface 324 and the stop feature 310. The locking surface 322 of the tab 316 can interface with the accessory 282 after the accessory 282 is installed on the rail 296 to prevent undesirable detachment of the accessory 282 from the rail 296. The unlocking surface 324 of the tab 316 allows the accessory 282 to interact with the tab 316 such that when the accessory 282 is being installed on the rail 296 the tab 316 deflects, thereby allowing the accessory 282 to pass by the tab 316 and slide onto the rail 296. The accessory 282 can maintain the arm 314 in the deflected position while the accessory 282 is translated (e.g., slid) along at least a portion of the rail 296.

In an embodiment, at least one of the locking and unlocking surfaces 322 and 324 can be angularly offset from a line B oriented parallel with the direction 306 of installation of the accessory 282 on the rail 296. For example, the locking surface 322 can be angularly offset from the line by a first angle di in a range of 1° and 89°, such as in a range of 5° and 85°, such as in a range of 10° and 80°, such as in a range of 15° and 75°, such as in a range of 20° and 70°, such as in a range of 25° and 65°, such as in a range of 30° and 60°. The unlocking surface 324 can be angularly offset from the line B by a second angle $\alpha_2$ in a range of 1° and 89°, such as in a range of 5° and 85°, such as in a range of 10° and 80°, such as in a range of 15° and 75°, such as in a range of 20° and 70°, such as in a range of 25° and 65°, such as in a range of 30° and 60°. In an embodiment, the first and second angles $\alpha_1$ and $\alpha_2$ can be different from one another. For instance, the unlocking surface 324 can form a relatively shallower (lesser) angle with respect to the line B and the locking surface 322 can form a relatively steeper (greater) angle with respect to the line B. By way of non-limiting example, the unlocking surface 324 can be angularly offset from the line B by approximately 45° and the locking surface 322 can be angularly offset from the line B by approximately 50°. Accordingly, the accessory 282 can be more easily attached to the rail 296 than removed from the rail 296.

In an embodiment, a first peak force $F_1$, as measured by a maximum amount of force (peak force) required to uninstall the accessory 282 from the rail 296, may be 101% a second peak force $F_2$, as measured by a maximum amount of force required to install the accessory 282 onto the rail 296. For example, $F_1$ can be at least 102% $F_2$, such as at least 103% $F_2$, such as at least 104% $F_2$, such as at least 105% $F_2$, such as at least 110% $F_2$, such as at least 115% $F_2$, such as at least 120% % $F_2$, such as at least 125% $F_2$, such as at least 130% $F_2$, such as at least 140% $F_2$, such as at least 150% $F_2$, such as at least 160% $F_2$, such as at least 170% $F_2$, such as at least 180% $F_2$, such as at least 190% $F_2$, such as at least 200% $F_2$. By way of non-limiting example, the first peak force $F_1$ can be in a range of 12.5 pounds (lbs) to 17.5 lbs while the second peak force $F_2$ can be in a range of 17.5 lbs and 22.5 lbs. As such, more peak force is required to remove the accessory 282 from the rail 296 than to install the accessory 282 on the rail 296. Relatively high peak force requirements can prevent accidental detachment of the accessory 282 in the event the accessory 282 is bumped or the power tool 281 experiences an impact or a high operating force during use. Relatively low peak force requirements during installation reduce the force required to overcome the locking component 312 and install the accessory 282 on the rail 296.

A method of installing the accessory 282 on the accessory mounting platform 280 will now be described in greater detail. Initially, it is noted that the accessory 282 may be installed or removed from the accessory mounting platform 280 with the accessory mounting platform 280 attached to the power tool 281 or prior to attaching the accessory mounting platform 280 to the power tool 281. The installation and removal steps for both sequences remain generally the same.

Initially, the accessory 282 is aligned with the accessory mounting platform 280 such that the groove 302 of the accessory 282 is in alignment with the rail head 298 of the accessory mounting platform 280. In an embodiment, aligning the groove 302 with the rail head 298 includes positioning the accessory 282 behind the body 284, i.e., with the central segment 286 disposed between the accessory 282 and the rail head 298. It is noted that while the accessory 282 is shown in FIG. 25 in a position behind the power tool 281 before installation of the accessory 282 on the rail 296, the accessory mounting platform 280 may be installed in a different orientation with respect to the power tool 281, resulting in initial alignment between the accessory 282 and the power tool 281 being different from that depicted. For example, the accessory mounting platform 280 can be installed on the power tool 281 from a front side of the power tool 281. Moreover, in some instances, the accessory mounting platform 280 can be inverted such that the accessory 282 is installed from the opposite side of the first segment 288 and moved towards the central segment 286 during installation. Alignment of the accessory 282 with the rail head 298 is intended to refer to an initial alignment therebetween regardless of the configuration of the accessory mounting platform 280 or the power tool 281.

Aligning the groove 302 of the accessory 282 with the accessory mounting platform 280 can orient the accessory 282 relative to the rail head 298 about a first axis (e.g., the X-axis) and a second axis (e.g., the Z-axis). Alignment can further include aligning the first and second terminating ends 304A and 304B of the accessory 282 with the first and second channels 300A and 300B (FIG. 23) of the accessory mounting platform 280. Aligning the first and second terminating ends 304A and 304B with the first and second channels 300A and 300B can orient the accessory 282 relative to the accessory mounting platform 280 about a third axis (e.g., the Y-axis).

In another embodiment, the rail 296 can include a different alignment protocol that aligns the accessory 282 with the rail 296 along the third axis in a manner similar to the channels 300 and terminating ends 304 described above. For example, the rail head 298 can include a projection that aligns (keys) with an indentation in the accessory 282.

After the groove 302 of the accessory 282 is aligned with the rail head 298, one or both of the accessory 282 and the rail head 298 are translated (e.g., slid) together with the accessory 282 moving in the direction 306. In an embodiment, the groove 302 can include a tapered (ramped) entrance that guides the groove 203 onto the rail head 298. After an initial displacement of the accessory 282 along the rail head 298, the leading end 308 of the accessory 282 (or another portion of the accessory 282) can contact the locking component 312, e.g., the unlocking surface 324 of the tab 316. The operator may experience contact between the accessory 282 and the locking component 312 through a tactile or audible indication. As the accessory 282 is further biased in the direction 306 along the rail 296, the locking component 312 is driven to an unlocked state, e.g., the arm 314 deflects causing the tab 316 to clear out of the way of the accessory 282. The accessory 282 can then translate (e.g., slide) along the rail head 298 towards the stop feature 310. As the accessory 282 translates along the rail head 298, the locking component 312 can be maintained in the unlocked state by a surface of the groove 302. Translation of the accessory 282 along the rail head 298 continues until the leading end 308 of the accessory 282 contacts, or is near contacting, the stop feature 310. When the accessory 282 contacts, or is about to contact, the stop feature 310, the tab 316 moves clear of the accessory 282 (e.g., behind a trailing end 326 of the accessory 282 or within a tab receiving area 328 (FIG. 26) in open communication with the groove 302) and the locking component 312 automatically returns to the locked state.

Figure 26:
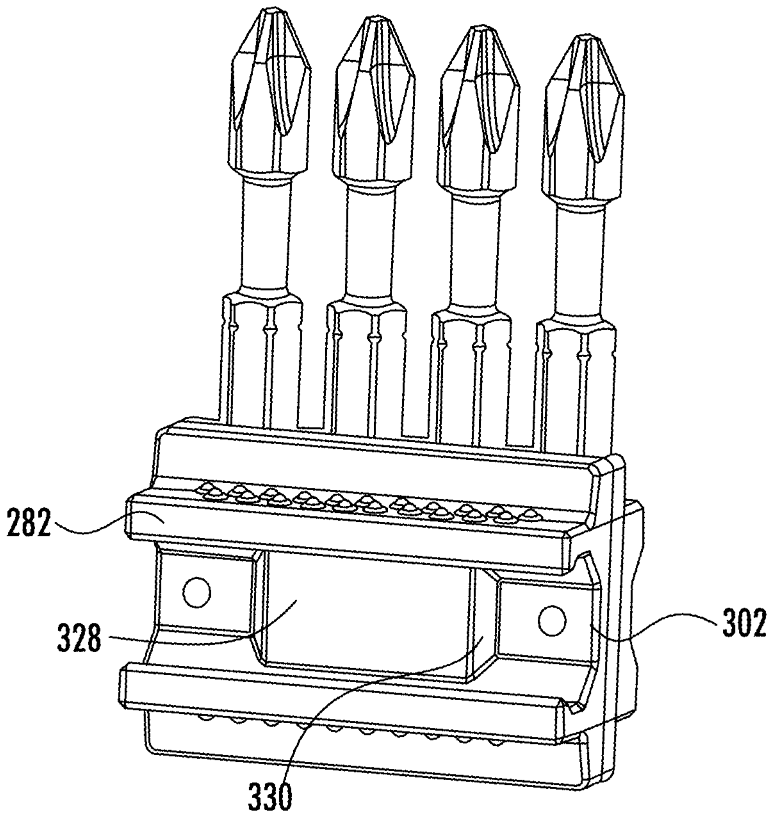
FIG. 26 is a perspective view of the accessory in accordance with embodiments of the present disclosure.

Referring to FIG. 26, the tab receiving area 328 can be defined by a pocket in open communication with the groove 302. The tab receiving area 328 can be sufficiently deep to allow the tab 316 to extend into the tab receiving area 328 and return at least partially to the locked state (as seen prior to installing the accessory 282 on the rail 296). The tab receiving area 328 can include a tapered sidewall 330. The tapered sidewall 330 can be disposed along a side of the tab receiving area 328 that interacts with the tab 316. To remove the accessory 282 from the rail 296, the tapered sidewall 330 interfaces with the locking surface 322 of the tab 316. Upon application of the second peak force $F_2$, the tapered sidewall 330 of the tab receiving area 328 causes the locking component 312 to move to the unlocked state, allowing the rail head 298 (FIG. 25) to slide within the groove 302. The accessory 282 can then be translated along the rail 296 and released from the accessory mounting platform 280.

The accessory 282 is in the locked position when the locking component 312 returns to the locked state. In some instances, the locked position can be sized the same as the accessory 282 such that the accessory 282 is not movable along the rail 296 once the accessory 282 is in the locked position. In other instances, the locked position may correspond to an area in which the accessory 282 can move relative to the rail 296 while remaining in the locked state. In the locked position, the accessory 282 may be referred to as being removably coupled to the accessory mounting platform 282. Once the accessory 282 is in the locked position, the locking component 312 can maintain the accessory in the locked position until such time that the accessory 282 is biased in the opposite direction with a force equal to or greater than the second peak force $F_2$ required to unlock the locking component 312.

In an embodiment, the locked position is large enough to receive a plurality of accessories 282. For example, the rail 296 can receive two accessories 282, three accessories 282, four accessories 282, etc. In some instances, each of the accessories 282 receivable on the rail 296 can define a same, or generally same size as one another, as measured in the longitudinal direction of the rail 296. In other instances, at least two accessories 282 can have different sizes as compared to one another, as measured in the longitudinal direction of the rail 296. In an embodiment, the rail 296 can define a plurality of locking components 312, each configured to interface with one of the plurality of accessories 282.

The second segment 290 of the accessory mounting platform 280 can share any one or more similar attributes as compared to the first segment 288. For example, referring again to FIG. 23, the second segment 290 can include a rail 332 configured to receive one or more accessories. In an embodiment, the rail 332 can receive the same accessories 282 as the rail 296. Such accessories 282 may be considered directional-independent, i.e., they can be installed with either rail 296 or 332 and orientation of the accessory 282 along the accessory mounting platform 280 and power tool 281 is not important. In another embodiment, the rail 332 can receive different accessories than the rail 296. These accessories 282 may be directional-dependent, i.e., they can only be installed in a single direction relative to the accessory mounting platform 280 or the power tool 281. The rail 332 of the second segment 290 can be formed by a rail head 334 and channels 336A and 336B. A stop feature 338 can be disposed at an end of the rail head 334 and define a stop surface that terminates movement of the accessory 282 along the rail 296.

Figure 28:
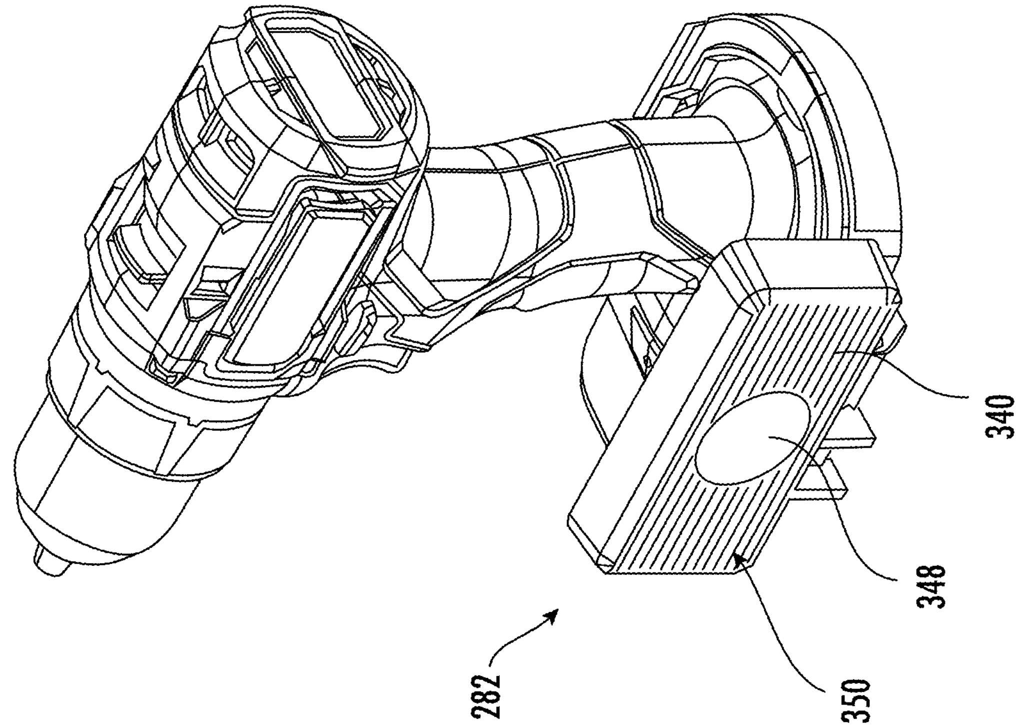
FIG. 28 is a rear perspective view of the power tool including the accessory coupled to the accessory mounting platform in a stored orientation in accordance with embodiments of the present disclosure.
Figure 27:
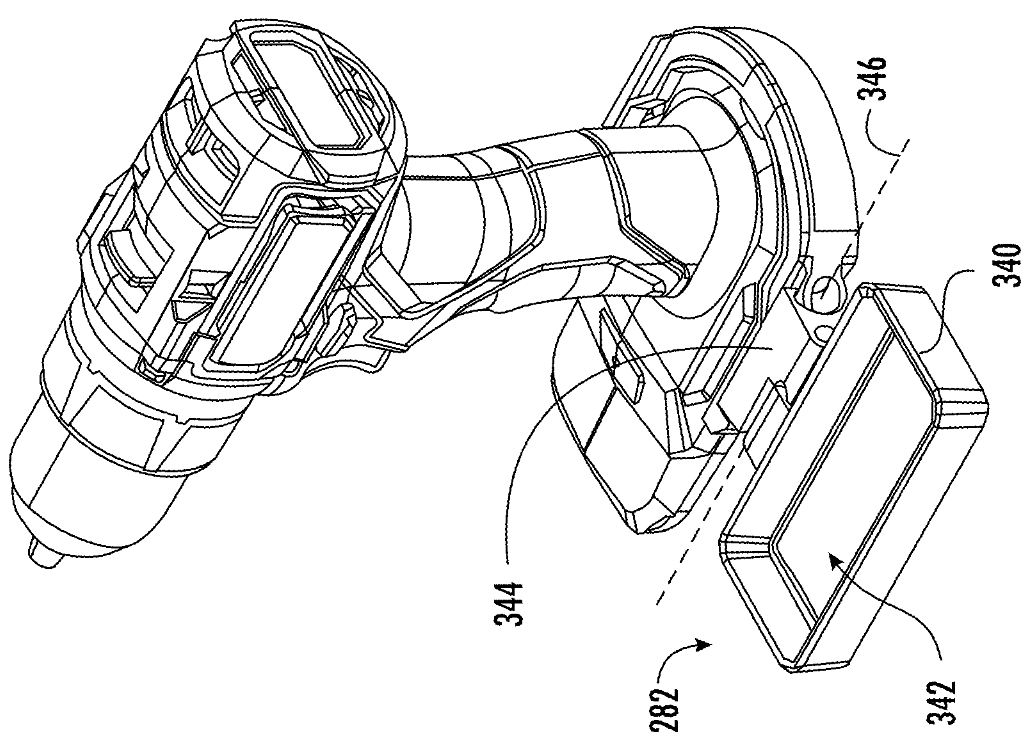
FIG. 27 is a rear perspective view of the power tool including an accessory coupled to the accessory mounting platform in an in-use orientation in accordance with embodiments of the present disclosure.

The accessory 282 may be selectable from a plurality of different accessories, each providing different functionality. For example, the accessory 282 depicted in FIGS. 25 and 26 is a bit holder. The bit holder can be similar or different as compared to any one or more of the bit holders 184, 210, and 236 described above. The bit holder can support one or more bits, e.g., driver heads or drill bits, that can be used with the power tool 281, e.g., the drill. In some instances, the accessory 282 may be reconfigurable between two or more different positions, orientations, configurations, or the like. For example, the accessory 282 can be a tray 340 (FIGS. 27 and 28) that holds one or more items within a storage volume 342. The tray 340 may be reconfigurable between two or more positions. A first of the two positions (an in-use position) is depicted in FIG. 27 and a second of the two positions (a stored position) is depicted in FIG. 28. The tray 340 may be reconfigured between the in-use and stored positions by moving the tray relative to attachment structure 344 about an axis 346. The attachment structure 344 includes the aforementioned groove 302 to couple the tray 340 to the accessory mounting platform 280. The tray 340 can include a magnet 348 that generates a magnetic field to retain metallic components within the storage volume 342. In an embodiment, the magnet 348 can be disposed at or adjacent to a bottom surface 350 of the tray 340. Other types of retention elements may be used instead of the magnet 348. For example, the tray 340 can include a cover (not illustrated), straps or ties, clips, or other retention features that selectively secure hardware and tools within the storage volume 342.

Figure 29:
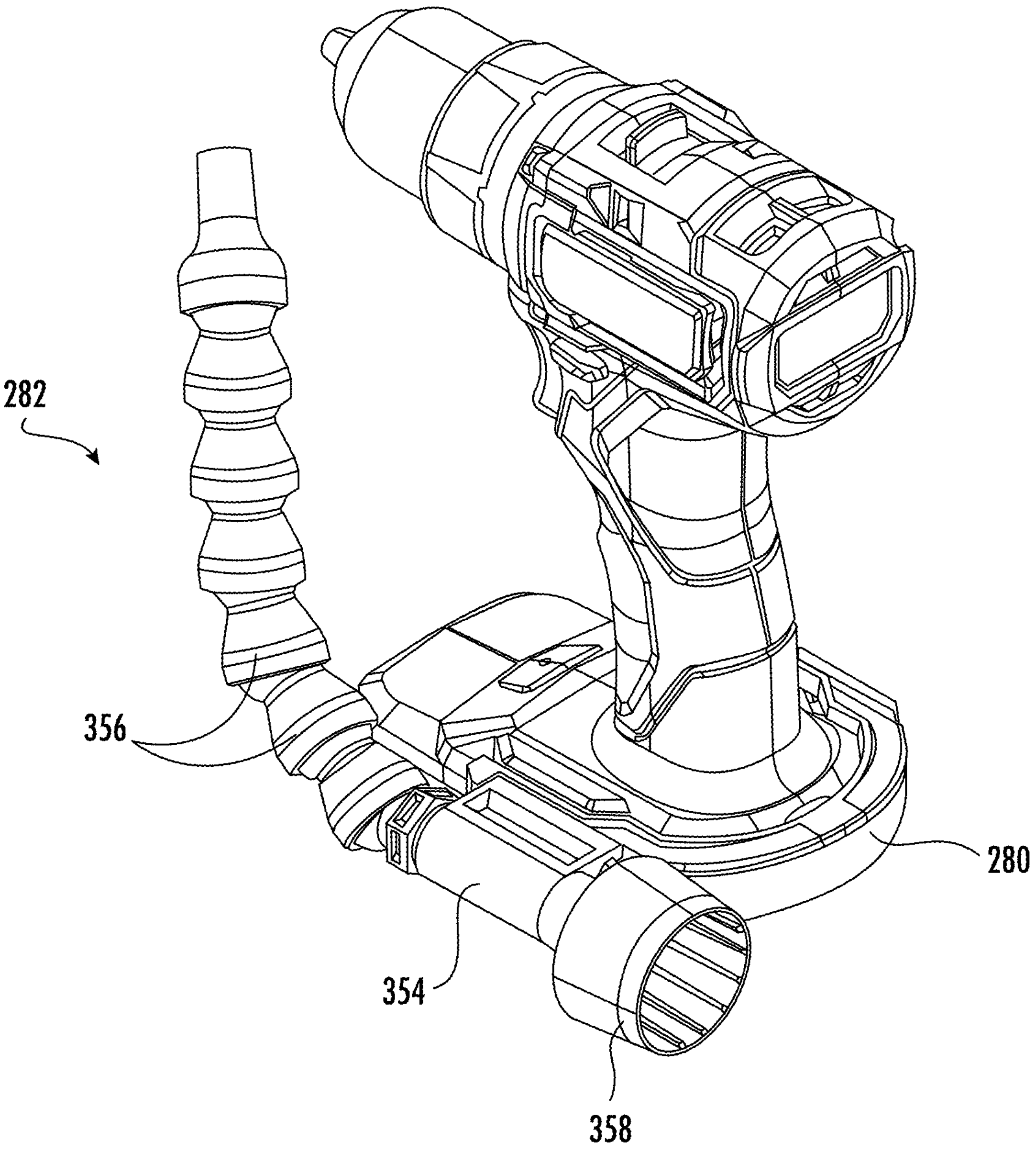
FIG. 29 is a rear perspective view of the power tool including a vacuum component coupled to the accessory mounting platform in accordance with embodiments of the present disclosure.

Referring to FIG. 29, the accessory 282 can include a vacuum attachment 352 that positions an intake opening of a vacuum (not illustrated) at a location proximate to a work area associated with the power tool. The vacuum attachment 352 can include an attachment structure 354 configured to couple the vacuum attachment 352 to the accessory mounting platform 280. A plurality of adjustable segments 356 can be coupled to the attachment structure 354 and movably extend towards the work area. A hose coupling 358 is in fluid communication with the adjustable segments 356, e.g., through an opening extending through the attachment structure 354. The hose coupling 358 can receive a hose (not illustrated) of the vacuum to selectively interface the vacuum with the work area. In some instances, the hose may be coupled to the house coupling 358 prior to the vacuum attachment 352 being coupled to the accessory mounting platform 280. In other instances, the hose may be coupled to the house coupling 358 after the vacuum attachment 352 is coupled to the accessory mounting platform 280.

Figure 30:
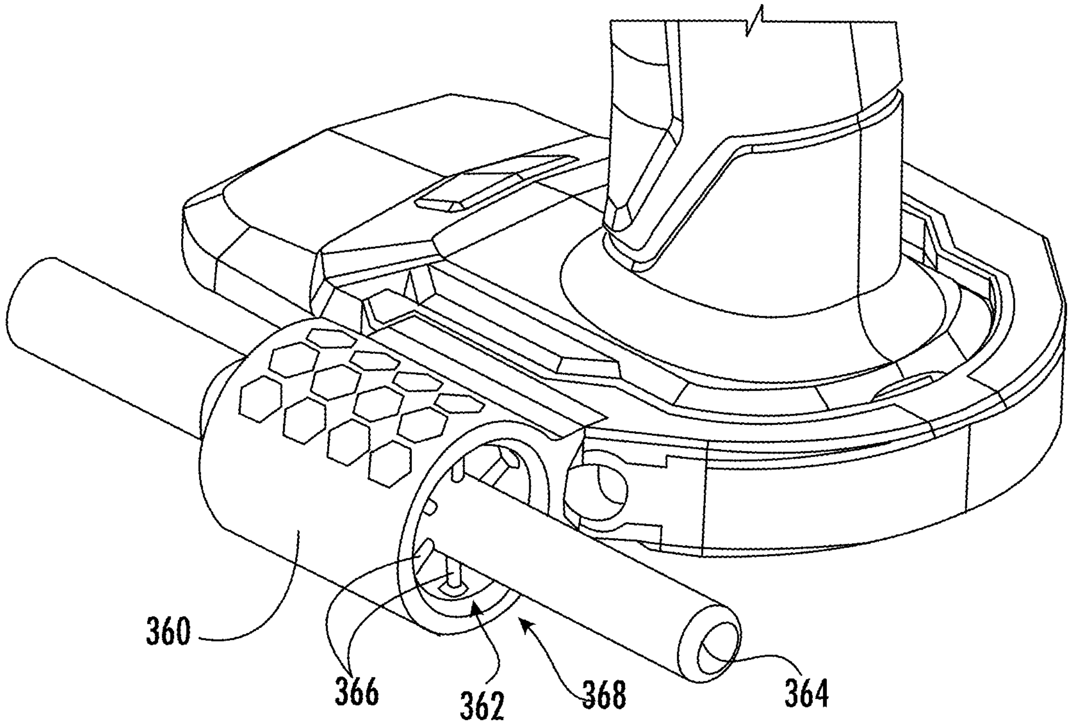
FIG. 30 is a rear perspective view of the power tool including a holder for receiving elongated members coupled to the accessory mounting platform in accordance with embodiments of the present disclosure.
Figure 32:
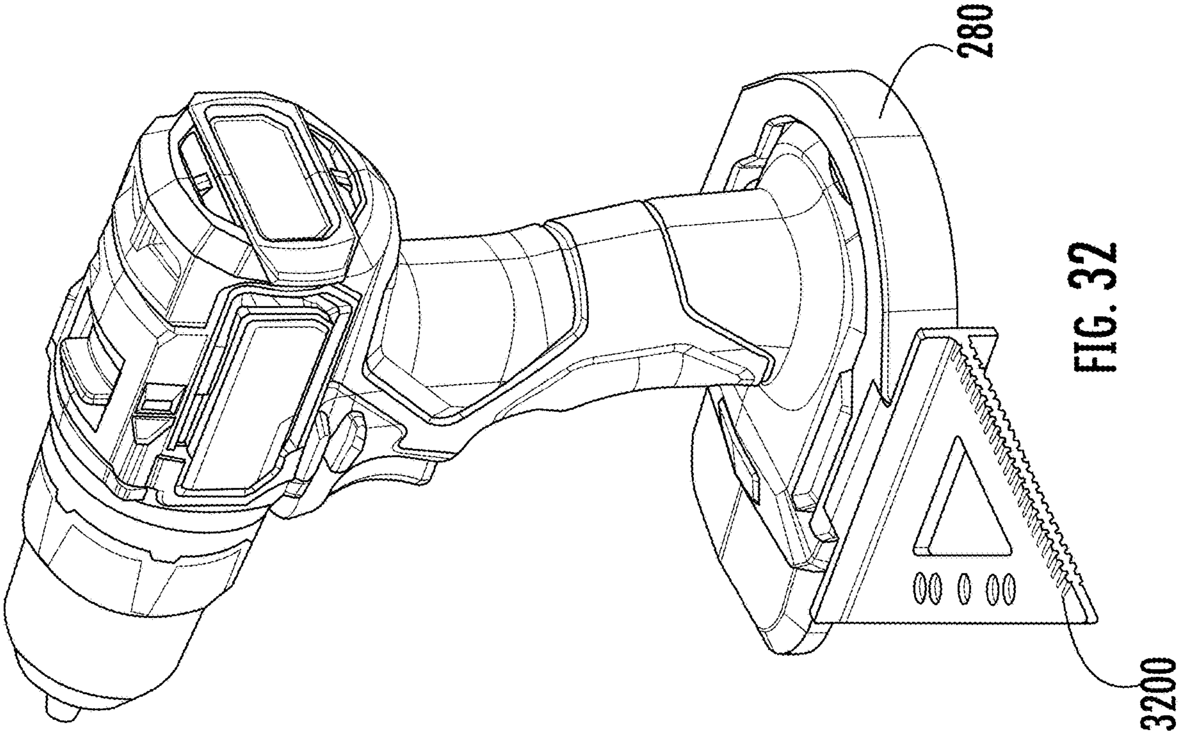
FIG. 32 is a rear perspective view of the power tool including a speed coupled to the accessory mounting platform in a first orientation in accordance with embodiments of the present disclosure.
Figure 31:
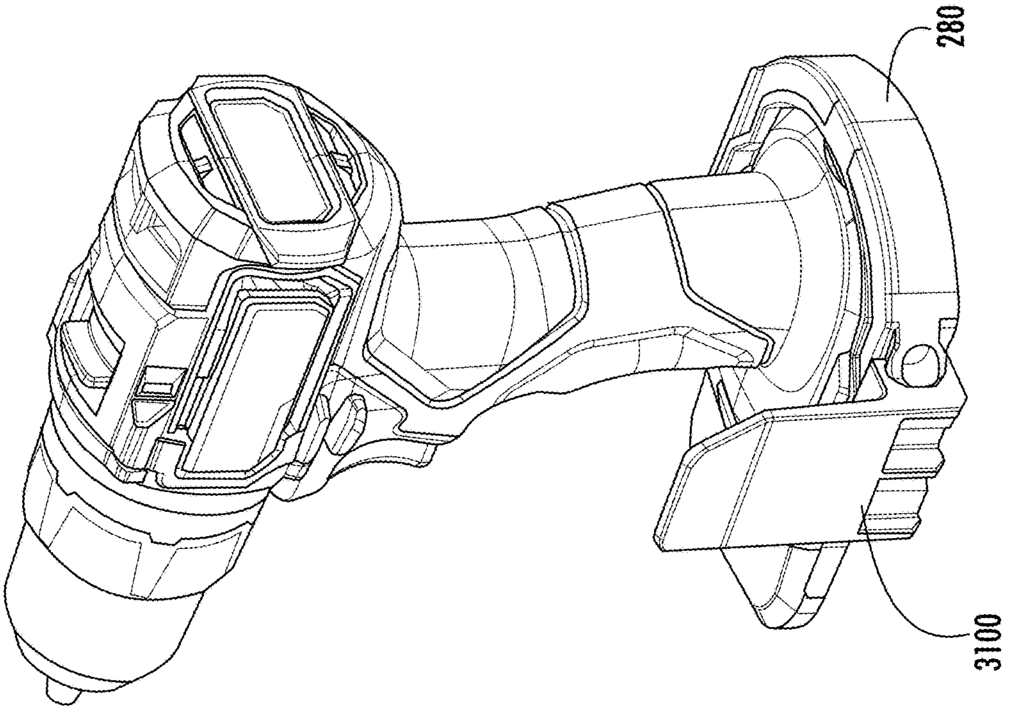
FIG. 31 is a rear perspective view of the power tool including a belt clip coupled to the accessory mounting platform in accordance with embodiments of the present disclosure.
Figure 34:
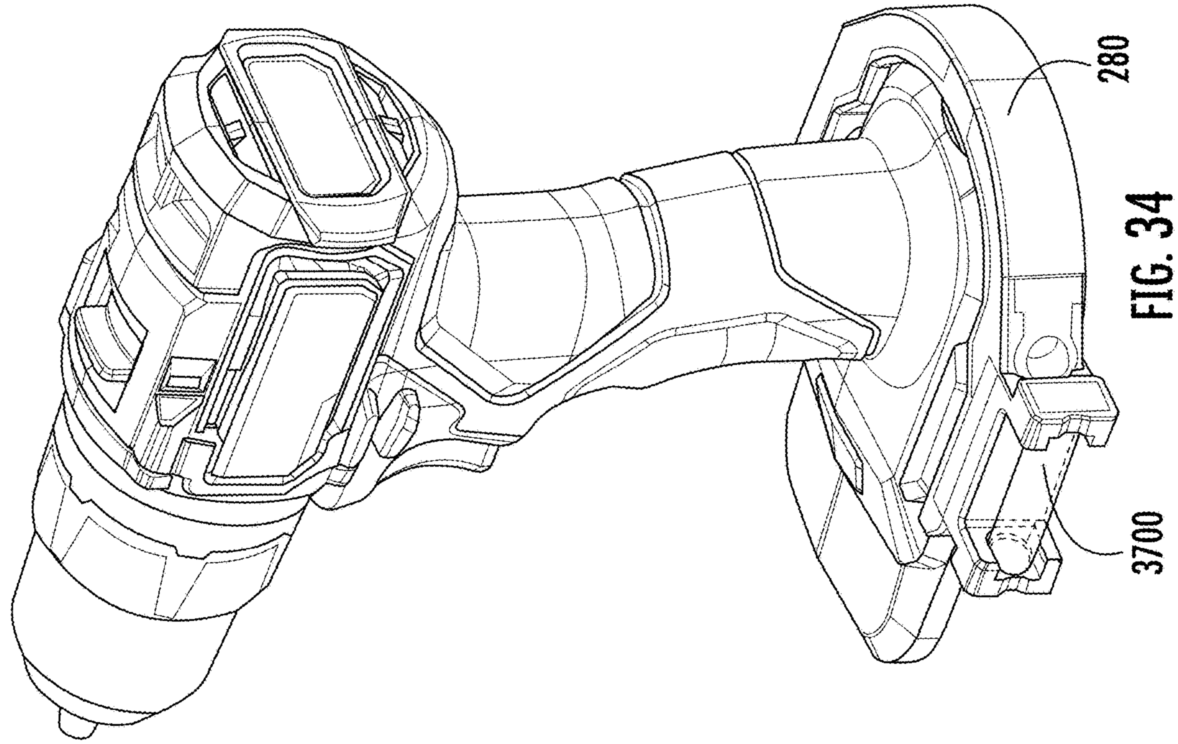
FIG. 34 is a rear perspective view of the power tool including a level coupled to the accessory mounting platform in accordance with embodiments of the present disclosure.
Figure 33:
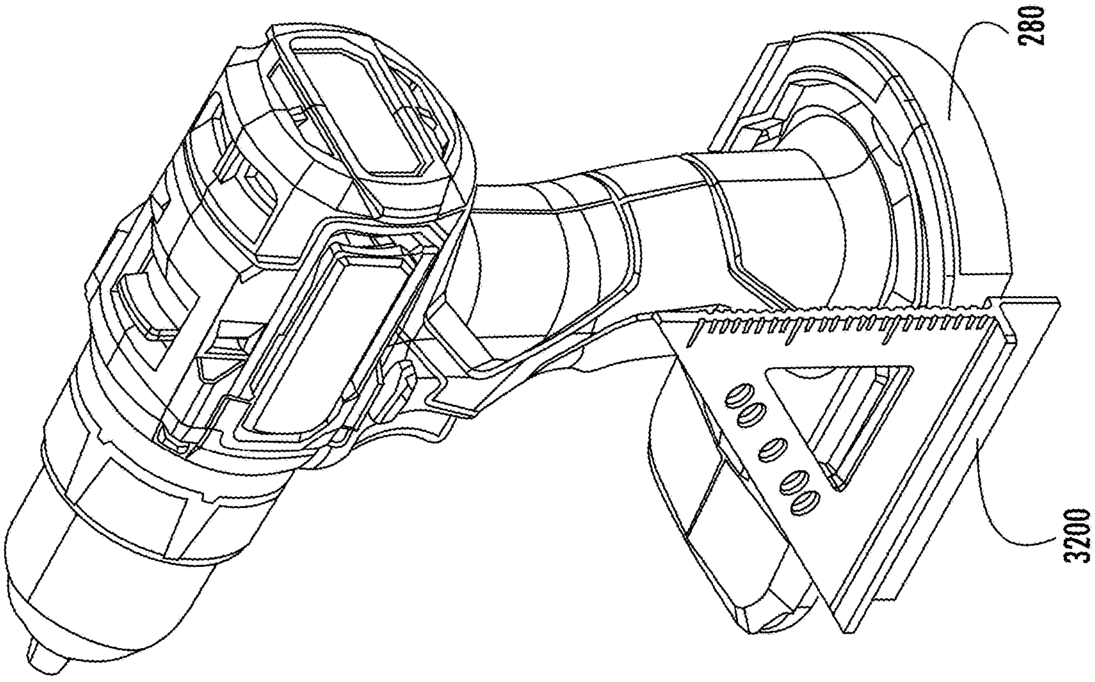
FIG. 33 is a rear perspective view of the power tool including the speed square coupled to the accessory mounting platform in a second orientation in accordance with embodiments of the present disclosure.
Figure 36:
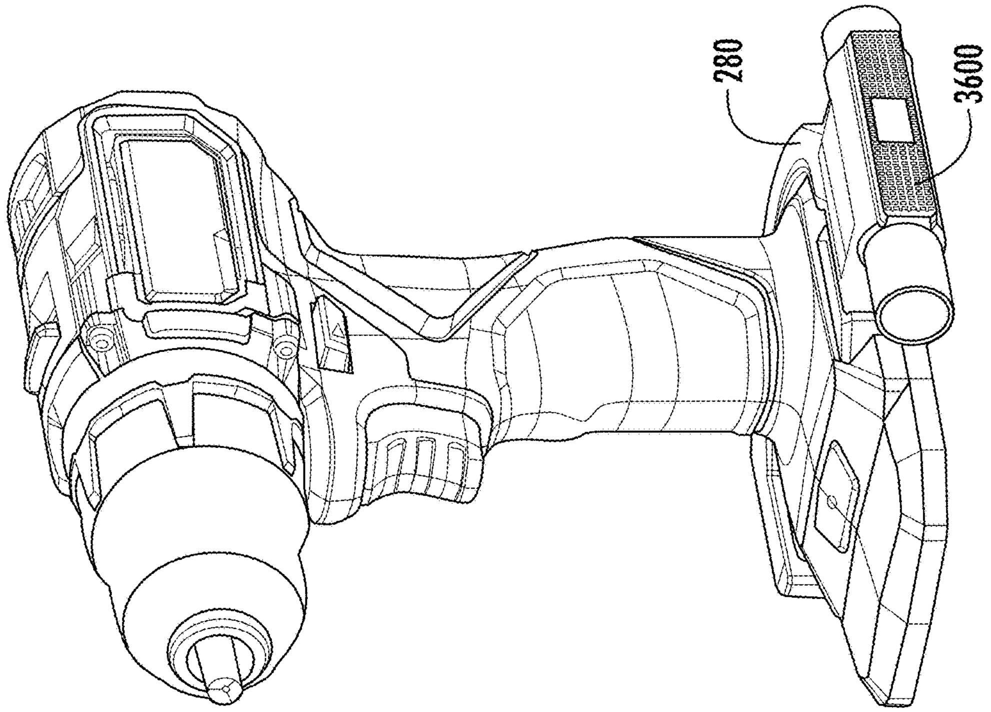
FIG. 36 is a front perspective view of the power tool including a light coupled to the accessory mounting platform in accordance with embodiments of the present disclosure.
Figure 35:
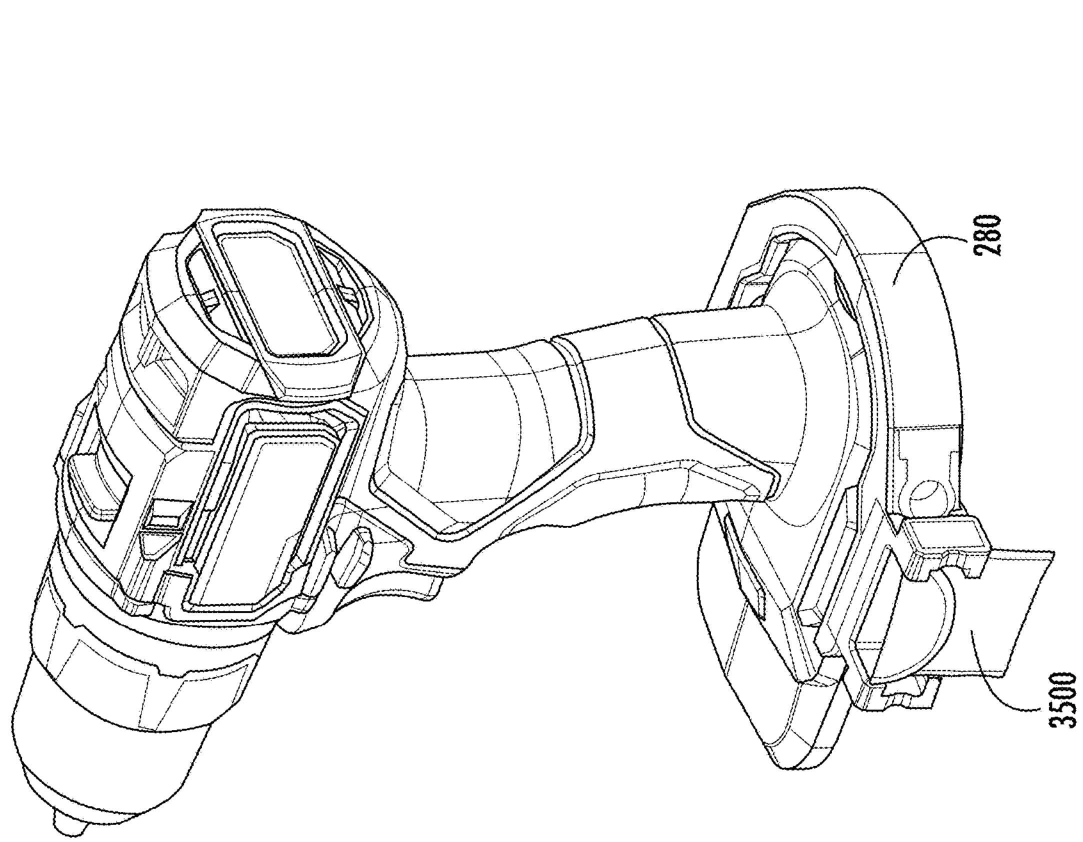
FIG. 35 is a rear perspective view of the power tool including a pouch coupled to the accessory mounting platform in accordance with embodiments of the present disclosure.
Figure 38:
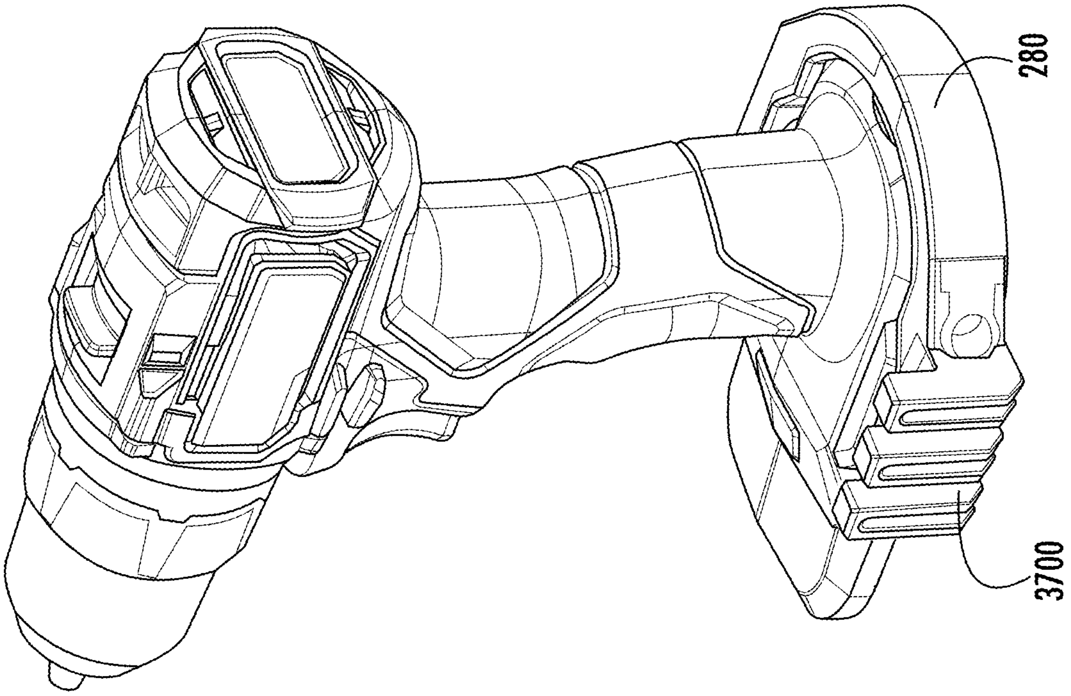
FIG. 38 is a rear perspective view of the power tool including a belt clip coupled to the accessory mounting platform in accordance with embodiments of the present disclosure.
Figure 37:
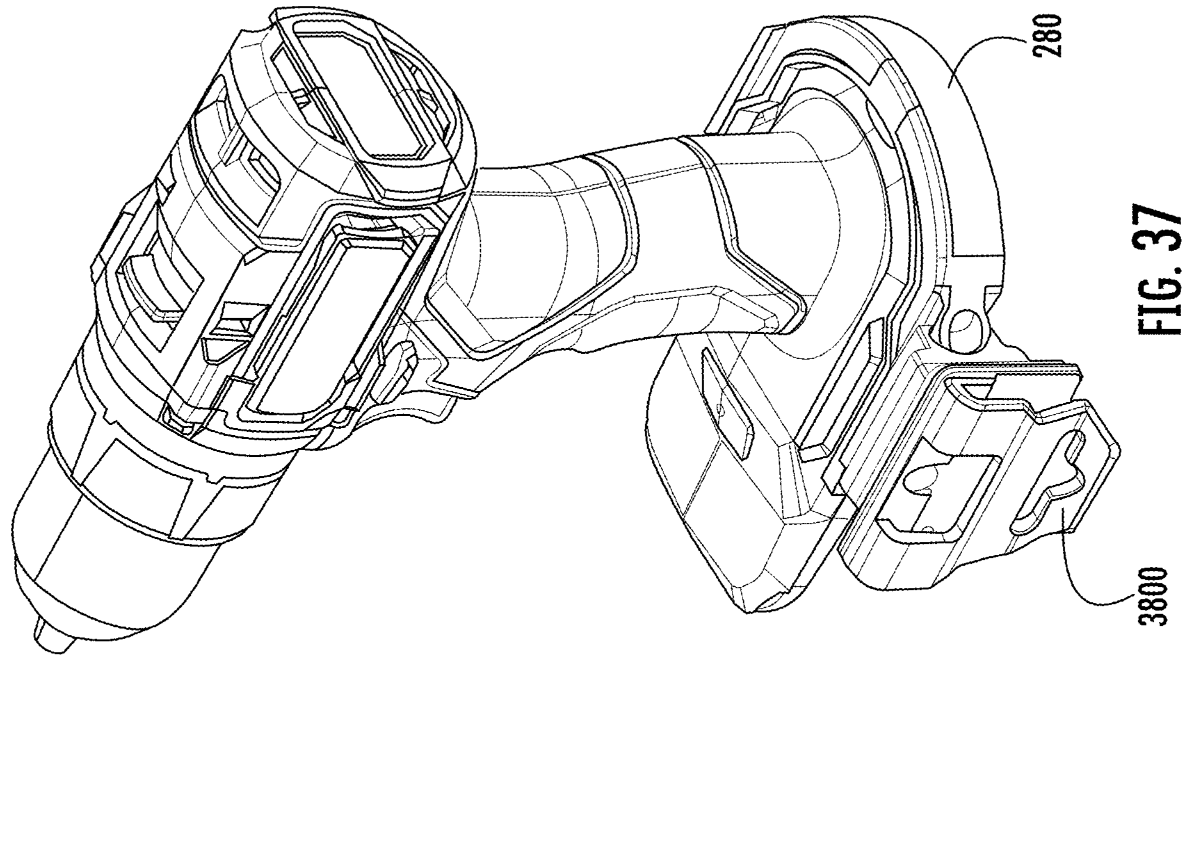
FIG. 37 is a rear perspective view of the power tool including a socket holder coupled to the accessory mounting platform in accordance with embodiments of the present disclosure.

Referring to FIG. 30, the accessory 282 can include a holder 360 defining a receiving area 362 for receiving and coupling with elongated objects 364, such as a pencil, a pen, a stylus, a laser pointer, or the like. In an embodiment, the receiving area 362 can be enclosed around at least 180° of its circumference, such as at least 270° of its circumference, such as at least 315° of its circumference. In an embodiment, the receiving area 362 is enclosed around 360° of its circumference. A plurality of fingers 366 can extend from the holder 360 into the receiving area 362 to support the elongated object within the receiving area 362. In an embodiment, the fingers 366 can be formed from a deformable material, such as elastomer, that deforms to accommodate a shape of the elongated object 364 while providing sufficient strength to prevent the elongated object 364 from detaching from the receiving area 362. The elongated object 364 can be installed within the receiving area 362 by aligning the elongated object 364 with an entrance 368 of the receiving area 362 and translating the elongated object 364 through the entrance 368 into the receiving area 362. In an embodiment, friction between the fingers 366 and the elongated object 364 can maintain the elongated object 364 within the receiving area 362 and prevent the elongated object 364 from falling out of the receiving area 362 during use of the power tool. In other embodiments, the elongated object 364 can be retained within the receiving area 362 by another method such as, but not limited to, a clamp, a band, an elastic loop, a ratcheting clasp, or the like.

Figure 40:
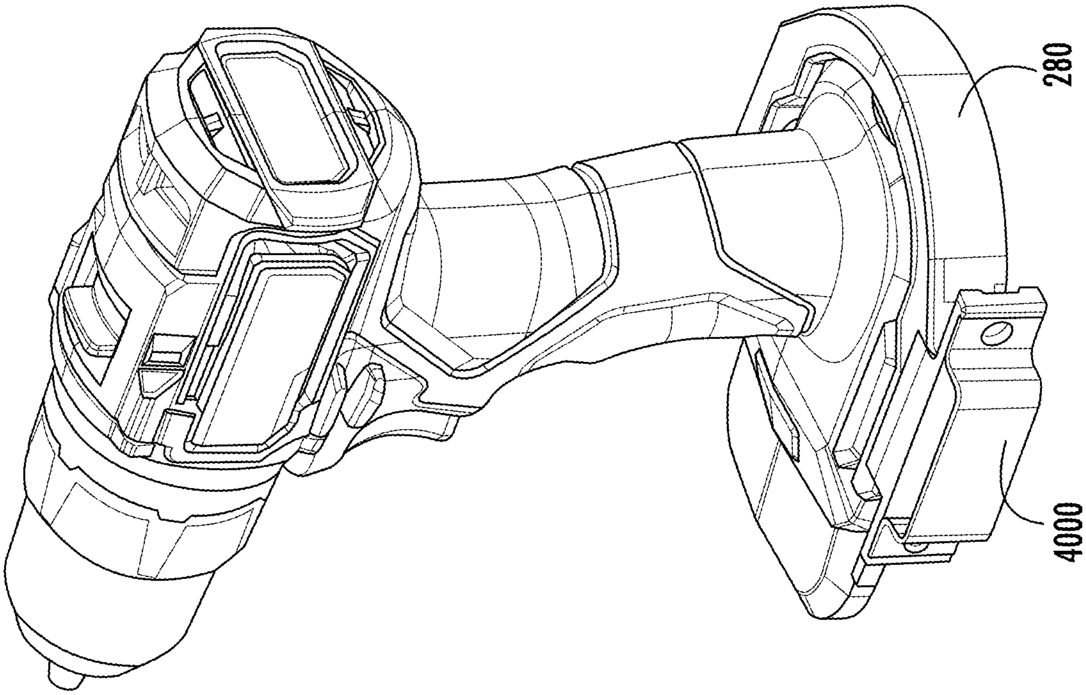
FIG. 40 is a rear perspective view of the power tool including a clip coupled to the accessory mounting platform in accordance with embodiments of the present disclosure.
Figure 39:
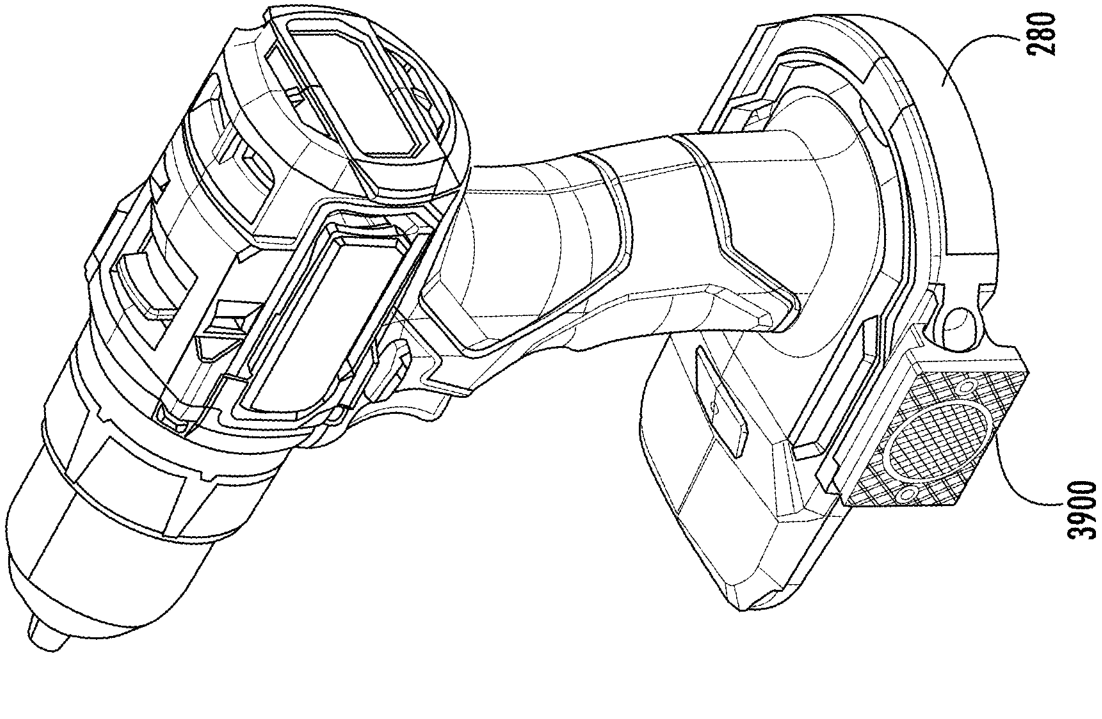
FIG. 39 is a rear perspective view of the power tool including a magnetic holder coupled to the accessory mounting platform in accordance with embodiments of the present disclosure.

Yet other types of accessories 282 can be coupled to the accessory mounting platform 280. Referring to FIGS. 31 to 40, these accessories 282 can include, for example, a rigid belt clip 3100 (FIG. 31), a speed square 3200 (FIGS. 32 and 33), a bubble level 3400 (FIG. 34), a soft pouch 3500 (FIG. 35), a light 3600 (FIG. 36), a socket holder 3700 (FIG. 378), a flexible belt clip 3800 (FIG. 38), a magnetic holder 3900 (FIG. 39), or a clip 4000 (FIG. 40). The speed square 3200 is shown in a first orientation in FIG. 32 and a second orientation in FIG. 33. In other embodiments, the accessory 282 can include a rigid case, an eraser or an eraser holder, a belt loop or utility belt loop, a shoulder strap, a chest strap, a wrist strap, another handheld tool (such as pliers, a screwdriver, etc), a digital level, a battery holder, a battery charger, a caliper holder, a ruler, a bottle or bottle holder, a thermometer, a multimeter, a voltage tester, a drill guide, a pocket hole jig, a handle, a shim or shims, a pencil sharpener, or the like. Use of the accessory mounting platform 280 allows an operator to quickly and easily switch between accessories 282 based on desired functionality at a given time or worksite.

Figure 41:
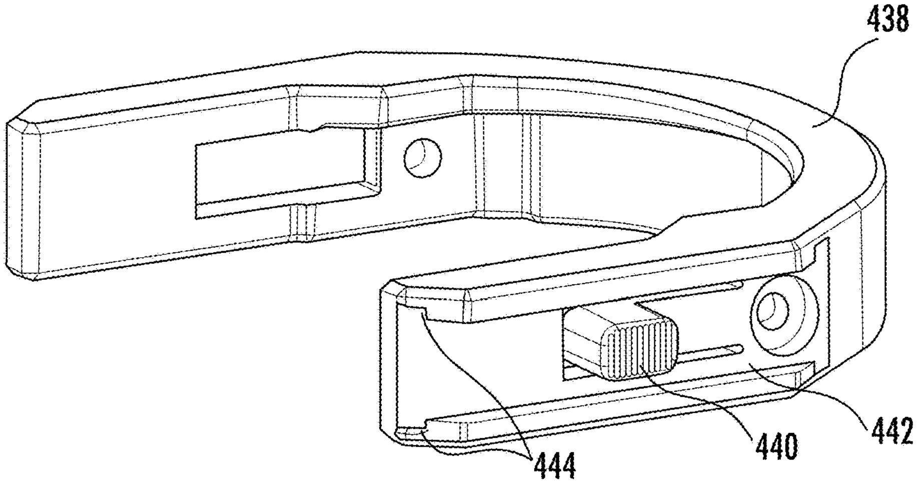
FIG. 41 is a perspective view of an accessory mounting platform in accordance with embodiment of the present disclosure.
Figure 42:
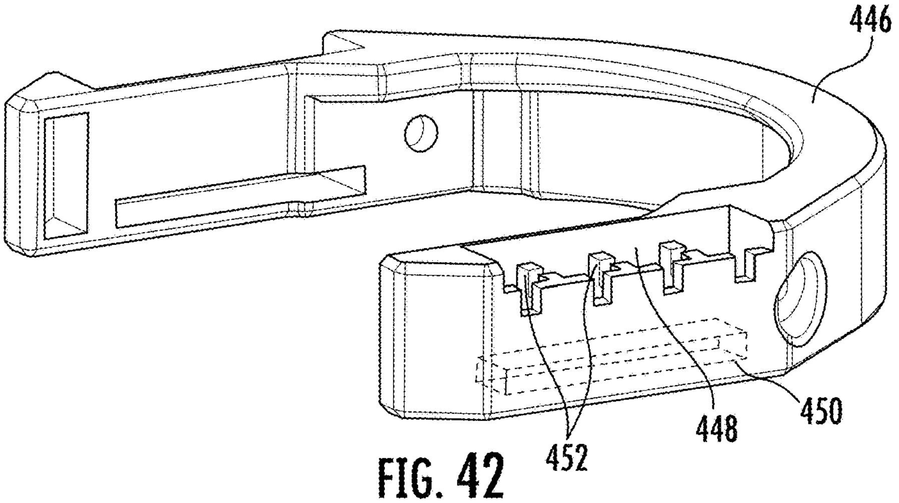
FIG. 42 is a perspective view of an accessory mounting platform in accordance with embodiment of the present disclosure.
Figure 43:
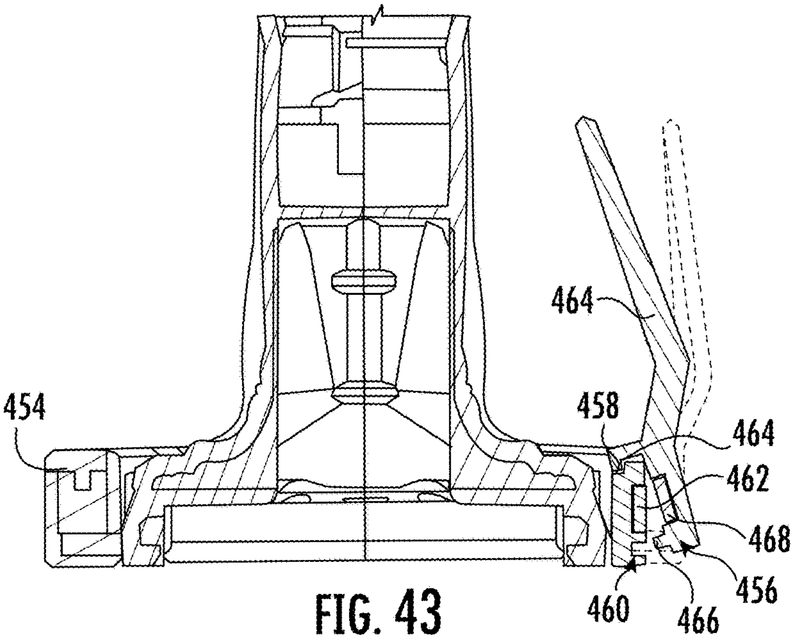
FIG. 43 is a perspective view of an accessory mounting platform in accordance with embodiment of the present disclosure.

FIGS. 41 to 43 illustrate the accessory mounting platform in accordance with other embodiments. FIG. 41 illustrates an accessory mounting platform 438 including a positive retention feature. The positive retention feature includes a locking component 440 with non-ramped ends. To install an accessory on the accessory mounting platform 438 the locking component 440 is manually deflected by the operator while the accessory is moved relative to (over) the locking component. To uninstall the accessory from the accessory mounting platform 438, the operator must depress the locking component 440 while moving the accessory past the locking component 440. The locking component 440 may remain depressed while the accessory is translated thereover. Unlike the rail head 298 on the accessory mounting platform 280, the accessory mounting platform 438 includes a channel 442 that receives flange(s) (not illustrated) of the accessory. The flange(s) align within the channel 442 and are retained in the channel 442 by lips 444 of the channel 442.

To install the accessory on the accessory mounting platform 438, the flanges are first aligned with the channel 442 and the accessory is then translated towards the locking component 440. If the locking component 440 is not depressed, the accessory will come into contact with the locking component 440 and be prevented from further translation along the channel 442 until the locking component 440 is depressed. Only after the locking component 440 is depressed can the accessory be installed and locked on the accessory mounting platform 438. By way of example, an operator can use one hand to depress the locking component 440 while using a second hand to translate (slide) the accessory relative to the channel 442. Once the accessory partially covers the locking component, the operator can release the locking component 440 and the accessory can maintain the locking component 440 in the depressed state as the accessory is translated (slid) along the channel 442. Once the accessory reaches a critical location (i.e., when the accessory is clear of the locking component 440), the locking component 440 returns to its undeflected state to lock the accessory to the accessory mounting platform 438.

To remove the accessory from the accessory mounting platform 438, the above steps are repeated in reverse. The locking component 440 (or some feature in communication with the locking component 440) may be accessible to the operator to allow operator access to the locking component 440. In an embodiment, the accessory can include a cutout that allows the locking component 440 to extend through the accessory when the accessory is locked to the accessory mounting platform 438. The operator can depress the locking platform 440 and translate (slide) the accessory from the channel 442.

FIG. 42 illustrates an accessory mounting platform 446 including an accessory receiving well 448. The well 448 defines a receiving volume in which a portion of an accessory can be installed to secure the accessory to the accessory mounting platform 446. The well 448 can include retention features to prevent the portion of the accessory from detaching from the well 448. By way of example, the retention features can include a magnet 450 that interfaces with a complementary magnet on the accessory or a magnetic component of the accessory. The magnet 450 can be disposed within the well 448, such as at a bottom surface of the well 448, or within a body of the accessory mounting platform 446, such as embedded therein. When the accessory is installed in the well 448, the magnet or magnetic component of the accessory interacts with the magnet 450 to maintain the accessory within the well 448. The retention features can also, or alternatively, include a plurality of structures 452 disposed at least partially within the well 448 that interface with complementary structures on the accessory to retain the accessory at the well 448. By way of non-limiting example, the structures 452 and complementary structures can form an interference fit with one another or a snap fit with one another. The structures 452 can also define a storage volume for one or more implements or components, such as driver bits, when the accessory is not coupled to the accessory mounting platform 446. The structures 452 can define recesses sized and shaped to receive, e.g., driver bits. Thus, the accessory mounting platform 446 can store implements and components even without an attached accessory holder or tool.

FIG. 43 illustrates an accessory mounting platform 454 including a cleat-style accessory attachment feature 456. The cleat-style accessory attachment feature 456 can include, for example, an upper channel 458, a lower channel 460, and a retention feature (such as a magnet 462). An accessory 464 to be received by the cleat-style accessory attachment feature 456 can include a top finger 464, a bottom finger 466, and a complementary retention feature (such as a magnet 468). To install the accessory 464 to the cleat-style accessory attachment feature 456, the operator first installs the top finger 464 relative to the upper channel 458. The accessory 464 is then pivoted about the upper channel 458 until the bottom finger 466 is disposed in the lower channel 460. The accessory 464 is shown in the attached position by dashed lines. The complementary retention feature can maintain the top and bottom fingers 464 and 466 within the upper and lower channels 458 and 460. Yet other types of cleat-style attachment protocols and interfaces are possible without deviating from the scope of the disclosure.

Figure 44:
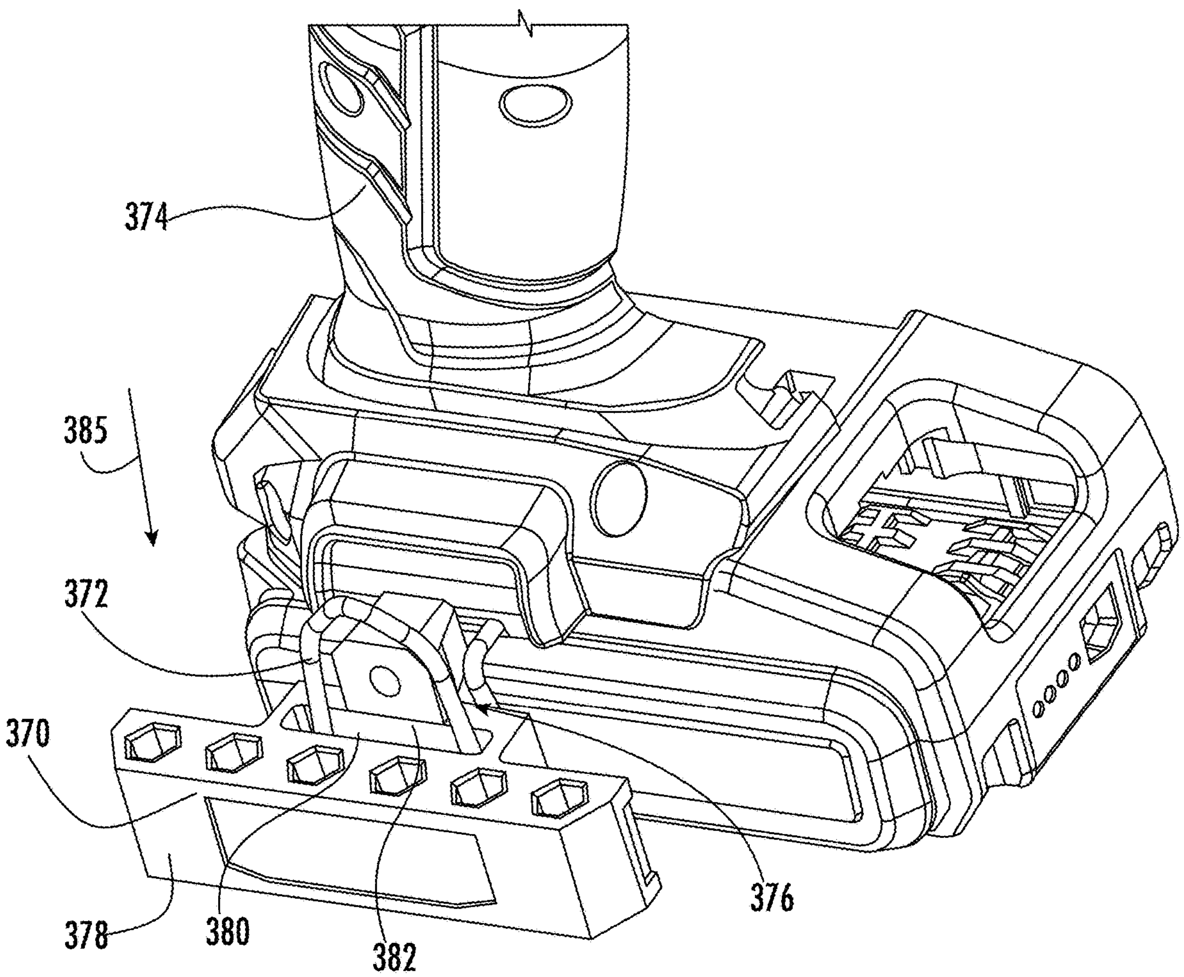
FIG. 44 is a front perspective view of a portion of a power tool including a tool holder in accordance with embodiments of the present disclosure.
Figure 46:
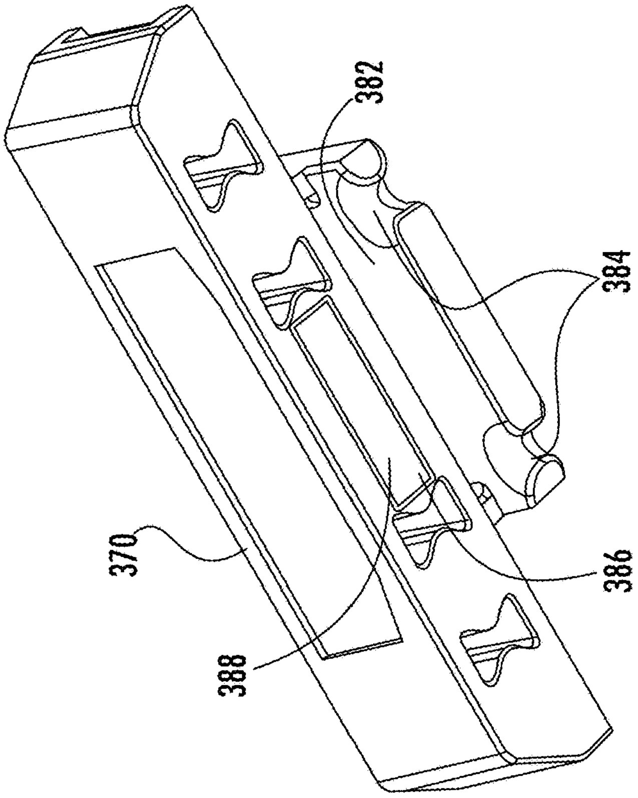
FIG. 46 is a rear perspective view of the tool holder in accordance with embodiments of the present disclosure.
Figure 45:
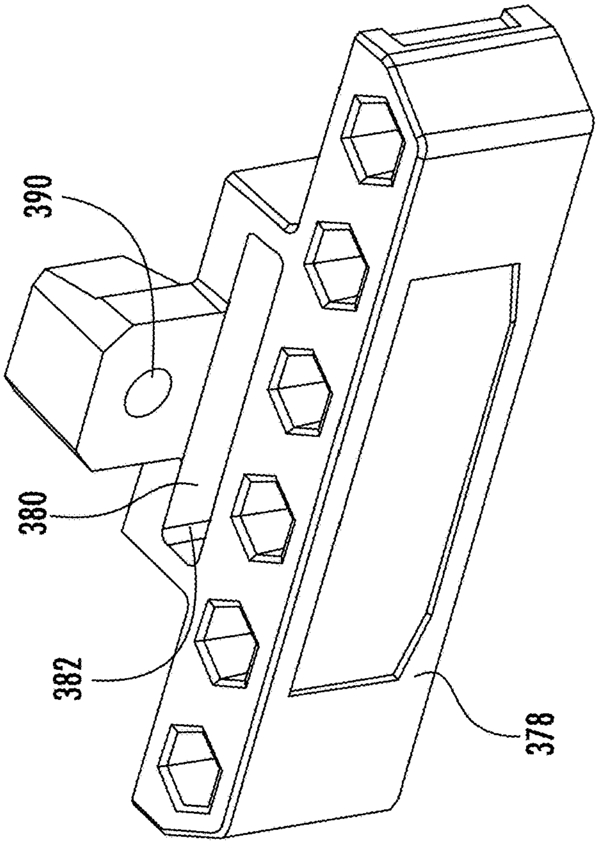
FIG. 45 is a top perspective view of the tool holder in accordance with embodiments of the present disclosure.

FIGS. 44 to 46 illustrate a tool holder 370 in accordance with an embodiment. The tool holder 370 is configured to be coupled to a tool, such as a power tool 374, and selectively couple one or more accessories to the tool. FIG. 44 illustrates the tool holder 370 coupled to a belt clip 372 of the power tool 374; FIG. 45 illustrates the tool holder 370 from a top perspective view; and FIG. 46 illustrates the tool holder 370 from a bottom perspective view. The following description is made with reference to the power tool 374, however, the tool holder 370 may also, or alternatively, be used with other types of tools, such as non-powered tools, storage elements and cases, etc.

Belt clips, like the belt clip 372 depicted in FIG. 44, are frequently used by power tools 374, such as hand held power tools, to allow an operator to connect the power tool 374 to a belt or other object for carrying the power tool 374 around a worksite. The belt clip 372 typically extends from a lateral aspect of the power tool 374. The belt clip 372 depicted in FIG. 44 extends from the power tool 374 and defines a receiving channel 376 configured to receive the belt or other object for carrying. The receiving channel 376 is often shaped narrower than the belt or other object to be received therein or includes a narrowed entrance. As the belt or other object is positioned within the receiving channel 376, the belt clip 372 deflects to allow the belt or other object to enter the receiving channel 376. As the belt or other object passes the entrance to the receiving channel 376, the belt clip 372 returns to its unbiased state to secure the belt or other object within the receiving channel 376 under spring force created by the belt clip 372.

The tool holder 370 includes a body 378 configured to be coupled to the belt clip 372. The body 378 can include an opening 380 through which a portion of the belt clip 372 extends when the tool holder 370 is coupled to the belt clip 372. A portion 382 of the body 378, such as a portion of the body 378 disposed adjacent to the opening 380, is configured to be disposed within the receiving channel 376. The portion 382 can fit within the receiving channel 376 and be confined therein by spring force of the belt clip 372. In an embodiment, the body 378 can define one or more belt clip engagement features 384. By way of example embodiment, the belt clip engagement features 384 can each include a cutout having a tapered entrance formed in the body 378 of the tool holder 370, such as at the portion 382, that couples to the belt clip 372. The belt clip engagement features 384 can automatically couple with the belt clip 372 as the tool holder 370 is moved into an engaged position with the belt clip 372 by translating the tool holder 370 in a direction 385. In an embodiment, the operator may receive an indication of positive engagement between the belt clip engagement features 384 and the belt clip 372. The indication can include, for example, an audible indication, a tactile indication, a visual indication, or any combination thereof.

In certain instances, the tool holder 370 may be used with power tools 374 that do not include belt clips 372. To accommodate such power tools 374, the tool holder 370 can further include an auxiliary attachment structure 390 configured to interface with attachment structures associated with these power tools 374. In an embodiment, the auxiliary attachment structure 390 includes an opening extending through the body 378. The opening can receive a fastener which extends through the body 378 and fastens the tool holder 370 to the power tool 374.

The tool holder 370 is configured to hold one or more components or implements (not illustrated) for use with the power tool 374. By way of non-limiting example, these components and implements can include driver bits, drill bits, socket heads, and other accessories and tools as described herein. In an embodiment, the tool body 378 can include an auxiliary engagement structure 386 configured to retain further components or implements associated with the power tool 374. In an embodiment the auxiliary engagement structure 386 includes a magnet 388 configured to removably couple fasteners and other metallic objects to the tool holder 370.

Figure 47:
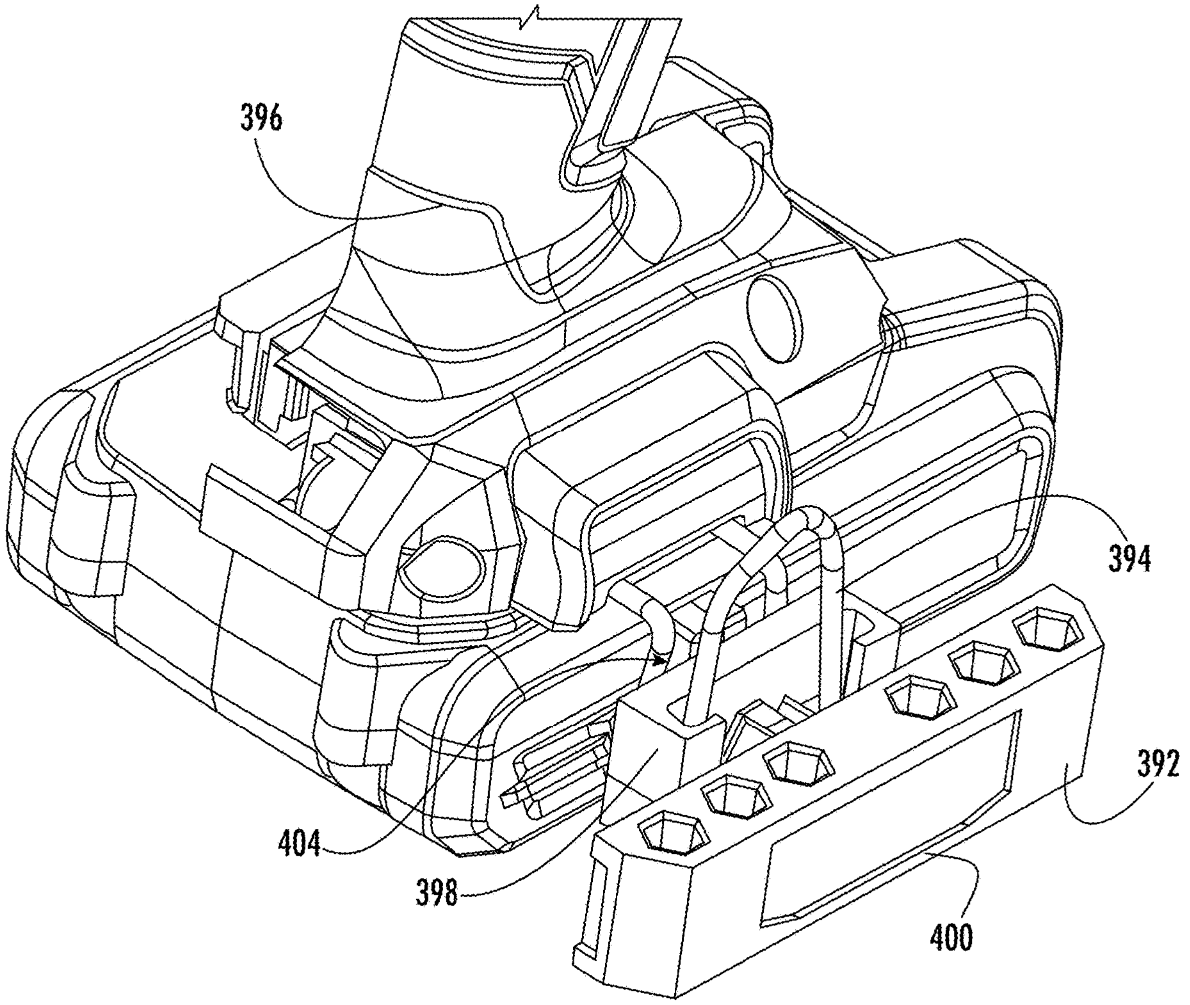
FIG. 47 is a rear perspective view of a portion of a power tool including a tool holder in accordance with embodiments of the present disclosure.
Figure 49:
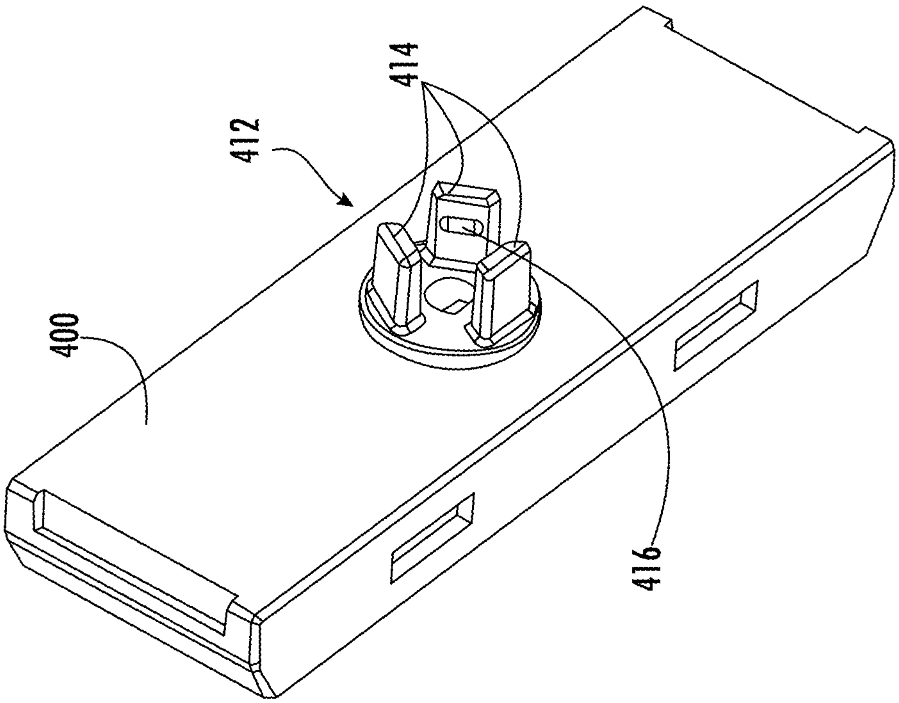
FIG. 49 is a rear perspective view of an attachment of the tool holder in accordance with embodiments of the present disclosure.
Figure 48:
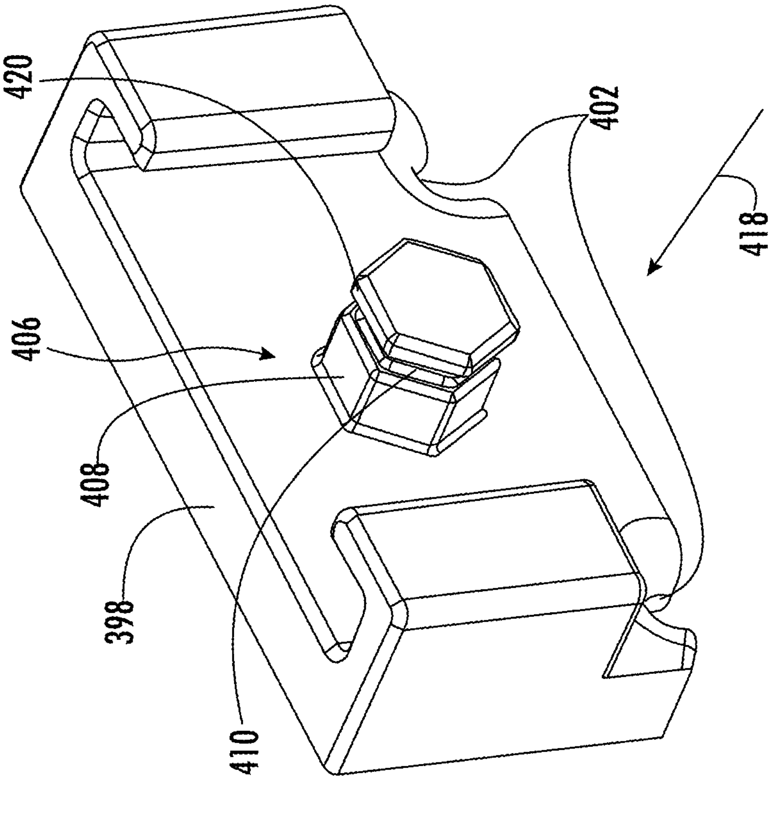
FIG. 48 is a front perspective view of a tool interfacing component of the tool holder in accordance with embodiments of the present disclosure.

FIGS. 47 to 49 illustrate a tool holder 392 in accordance with an embodiment. FIG. 47 illustrates the tool holder 392 coupled to a belt clip 394 of a power tool 396. The following description is made with reference to the power tool 396, however, the tool holder 392 may also, or alternatively, be used with other types of tools, such as non-powered tools, storage elements and cases, etc.

Unlike the tool holder 370 illustrated in FIGS. 44 to 46, the tool holder 392 has a multi-piece construction, including for example, a tool interfacing component 398 configured to be coupled to the power tool 396 and an attachment 400 configured to be removably coupled to the tool interfacing component 398. The attachment 400 is configured to hold one or more components or implements (not illustrated) for use with the power tool 396. By way of non-limiting example, these components and implements can include driver bits, drill bits, socket heads, and other accessories and tools as described herein. The tool holder 392 can operate in a manner similar to the tool holder 370 described above with respect to FIGS. 44 to 46. For example, the tool holder 392 can be coupled to the belt clip 394 of the power tool 396 by translating the tool holder 392, or a portion thereof, onto the belt clip 394 until auxiliary attachment structure 402 of the tool holder 392 are coupled with the belt clip 394. The tool holder 392 can be sandwiched between segments of the belt clip 394 within a receiving channel 404 of the belt clip 394.

FIG. 48 illustrates the tool interfacing component 398 from a front, top perspective view and FIG. 49 illustrates the attachment 400 from a rear, bottom perspective view. Referring to FIGS. 48 and 49, the tool interfacing component 398 can include an attachment structure 406 configured to couple the attachment 400 to the tool interfacing component 398. In an embodiment, the attachment structure 406 includes a projection 408 defining a mating interface, such as a channel 410 extending around the circumference of the projection 408. The accessory 400 can include a complementary attachment structure 412 including, for example, flanges 414 having detents 416 that interface with the channel 410 to couple the accessory 400 to the tool interfacing component 398. As the accessory 400 is moved towards the tool interfacing component 398 in a direction 418, the flanges 414 deflect to allow the detents 416 to pass over a lip 420. Once the detents 416 pass over the lip 420 and enter the channel 410, the flanges 414 can return to their unbiased state with the detents 416 engaged with the channel 410 to retain the accessory 400 on the tool interfacing component 398. Yet other types of attachment structures and protocols between the tool interfacing component 398 and attachment 400 are contemplated herein. For example, the tool interfacing component 398 and attachment 400 can include a ball and socket joint, a magnetic interface, a bayonet connection, a twist to lock connection, or any other known attachment component or protocol. Yet further, the components of the tool interfacing component 398 and the attachment 400 can be reversed such that the attachment 400 includes the attachment structure 406 and the tool engagement component 398 includes the complementary attachment structure 412. Using the tool holder 392, the operator can switch between a plurality of different attachments 400 without removing the tool interfacing component 398 from the power tool 396.

Figure 50:
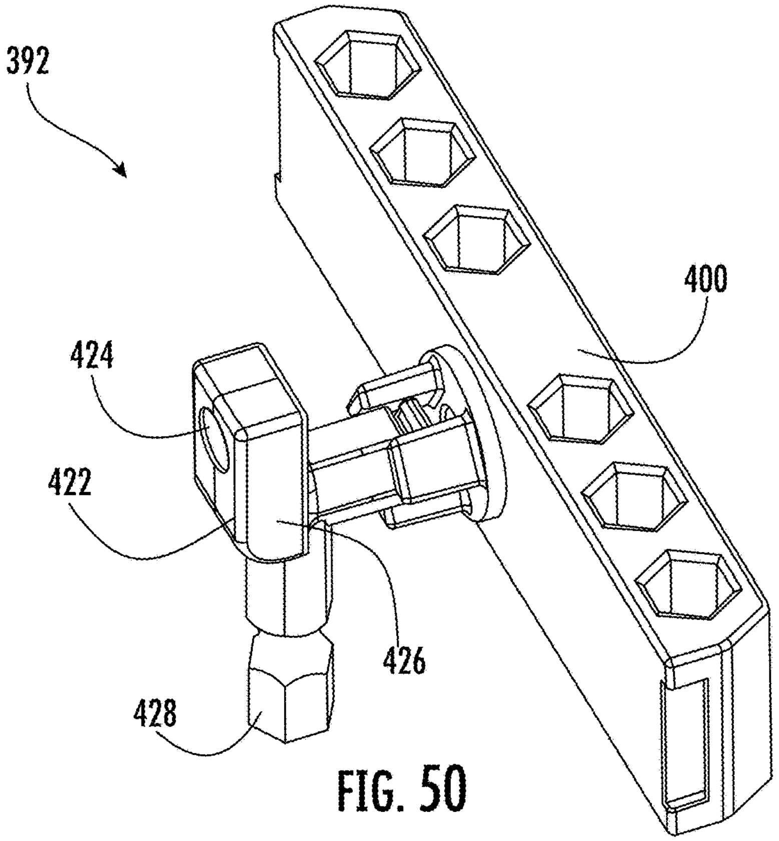
FIG. 50 is a rear perspective view of a tool holder in accordance with embodiments of the present disclosure.
Figure 51:
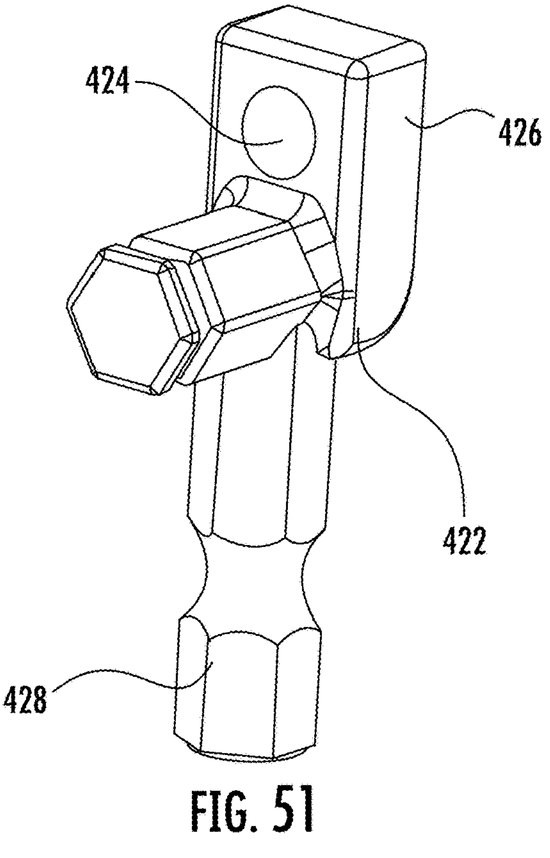
FIG. 51 is a front perspective view of a universal tool engagement component of the tool holder in accordance with embodiments of the present disclosure.
Figure 52:
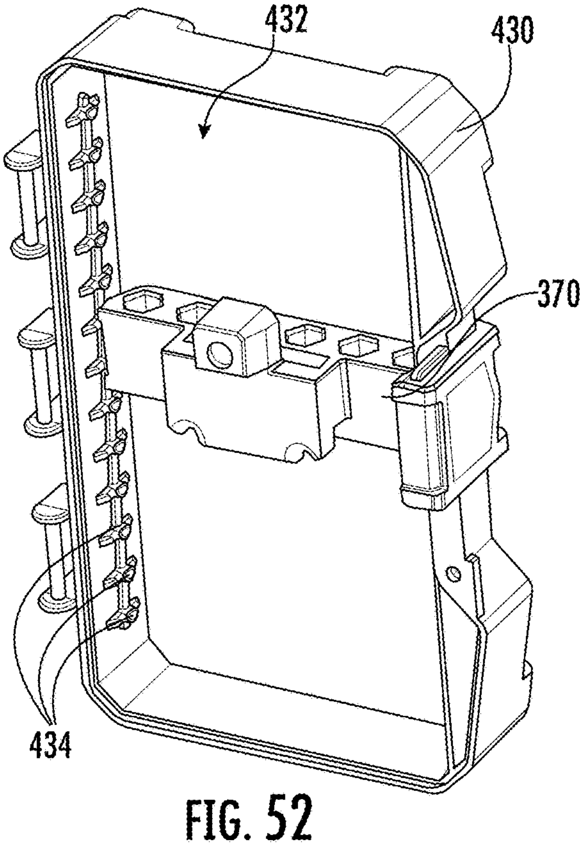
FIG. 52 is a front perspective view of a case holding the tool holder in accordance with embodiments of the present disclosure.
Figure 53:
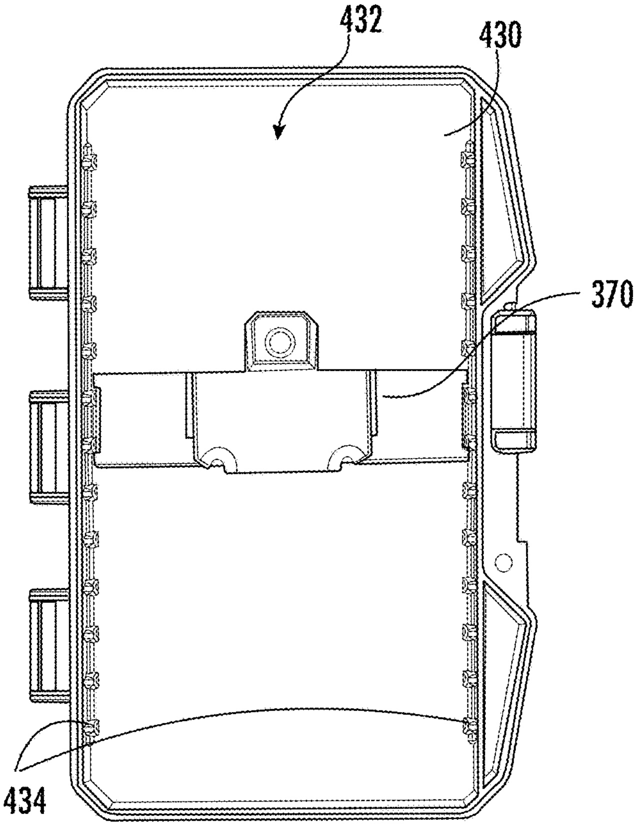
FIG. 53 is a front view of the case holding the tool holder in accordance with embodiments of the present disclosure.
Figure 54:
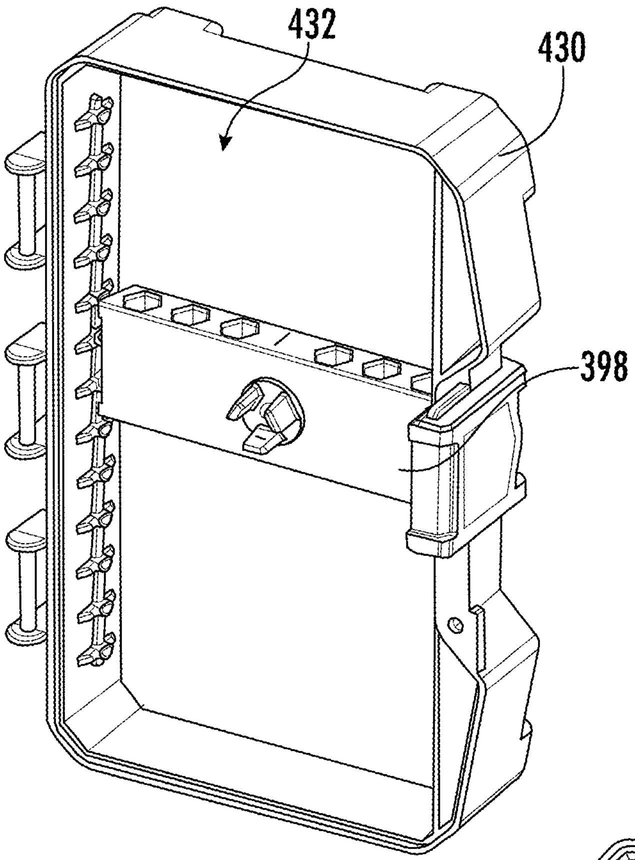
FIG. 54 is a front perspective view of a case holding the tool interfacing component in accordance with embodiments of the present disclosure.
Figure 55:
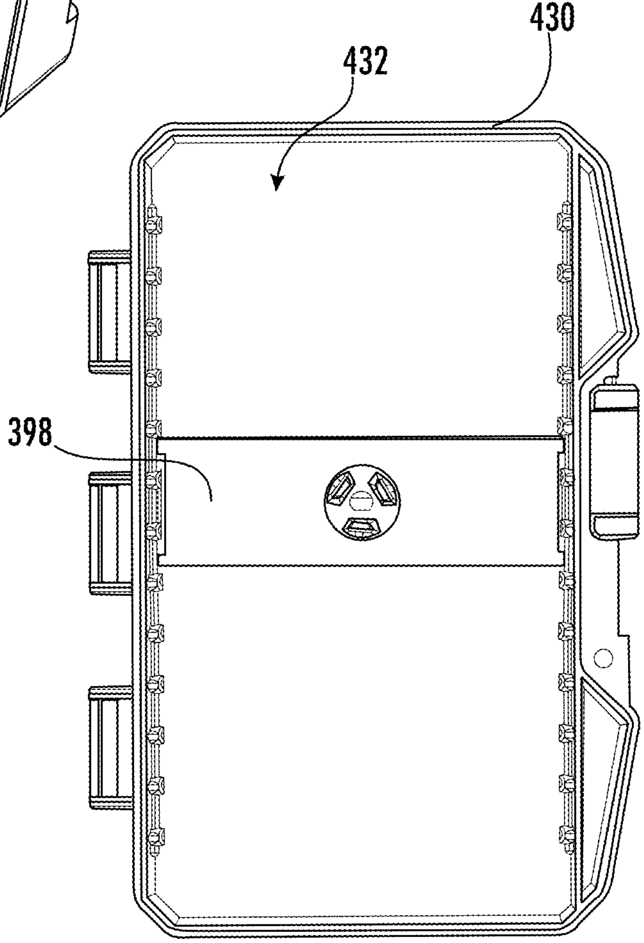
FIG. 55 is a front view of the case holding the tool interfacing component in accordance with embodiments of the present disclosure.

FIGS. 50 and 51 illustrate the tool holder 392 in accordance with another embodiment. FIG. 50 illustrates the tool holder 392 including the attachment 400 coupled to a universal tool engagement component 422; and FIG. 51 illustrates the universal tool engagement component 422. Referring to FIGS. 50 and 51, the universal tool engagement component 422 can include the attachment structure 406 as described in the embodiment depicted in FIG. 48. However, the universal tool engagement component 422 is configured to interface with different attachment structures of the power tool 396. The universal tool engagement component 422 can include a first engagement structure 424. In an embodiment, the first engagement structure 424 includes an opening extending through a body 426 of the universal tool engagement component 422. The opening can receive a fastener which extends through the body 426 and fastens the universal tool engagement component 422 to the power tool 396. The universal tool engagement component 422 can further include a second engagement structure 428. In an embodiment, the second engagement structure 428 can include a shank configured to interface with the working element of the power tool 396. For example, the shank can be a hex shank that interfaces with the chuck of a drill to attach the universal tool engagement component 422 to the chuck of the drill.

In an embodiment, at least one of the tool holder 370, the tool holder 392, the tool interfacing component 398, or the universal tool engagement component 422 can be stored in a case 430. Referring to FIGS. 52 to 55, the case 430 can include an internal volume 432 similar to internal volume 110 depicted in FIGS. 1 and 2. The tool holder 370, the tool holder 392, the tool interfacing component 398, or the universal tool engagement component 422 can fit within the internal volume 110 and attached to the case 430 at one or more engagement structures 434. The engagement structures 434 can be similar to the engagement structures 122 depicted in FIGS. 1 and 2. The tool holder 370, the tool holder 392, the tool interfacing component 398, or the universal tool engagement component 422 can include complementary attachment structures 436 (FIGS. 47 and 52) that interface with the engagement structures 434 to selectively retain the tool holder 370, the tool holder 392, the tool interfacing component 398, or the universal tool engagement component 422 in the internal volume 432 of the case 430.

Tool holders, accessory mounting platforms, and the other systems and methods described herein allow greater flexibility to an operator by allowing the operator to maintain one or more selectable accessories with a power tool. Some of these accessories may include swappable implements that allow the power tool to rapidly reconfigure between different uses (e.g., a bit holder). Others of these accessories can perform auxiliary functionality while the power tool is being used (e.g., a vacuum attachment). Since the operator is able to quickly switch between the accessories attached to the power tool by detaching an existing accessory from the accessory mounting platform and attaching a new accessory to the accessory mounting platform, the operator can rapidly reconfigure the power tool for different projects and use cases.

Further aspects of the invention are provided by one or more of the following embodiments:

Embodiment 1. An accessory mounting platform for a tool, the accessory mounting platform comprising: a body configured to be removably coupled to the tool; a first rail coupled to the body, the first rail comprising a rail head configured to slidably receive an accessory and couple the accessory to the tool; and a locking component configured to selectively retain the accessory on the first rail, wherein the locking component automatically moves from a locked state to an unlocked state when the accessory is slid along the first rail over the locking component in a first direction, and wherein the locking component automatically moves to the locked state once the accessory reaches a locked position on the first rail.

Embodiment 2. The accessory mounting platform of any one or more of the embodiments, wherein the rail head is unitary with the body, and wherein the locking component is disposed on the rail head.

Embodiment 3. The accessory mounting platform of any one or more of the embodiments, further comprising a second rail coupled to the body, the second rail comprising a rail head configured to slidably receive the accessory.

Embodiment 4. The accessory mounting platform of any one or more of the embodiments, wherein the locking component comprises: an arm including a proximal end and a distal end; and a tab disposed on the arm adjacent to the distal end of the arm, wherein a proximal end of the arm is integral with the first rail, and wherein the tab is configured to interface with the accessory to selectively lock the accessory to the first rail.

Embodiment 5. The accessory mounting platform of any one or more of the embodiments, wherein the tab defines a locking surface and an unlocking surface, and wherein a first ramp angle of the locking surface is different than a second ramp angle of the unlocking surface.

Embodiment 6. The accessory mounting platform of any one or more of the embodiments, wherein the first ramp angle is greater than the second ramp angle.

Embodiment 7. The accessory mounting platform of any one or more of the embodiments, wherein a peak force required to install the accessory on the first rail is less than a peak force required to remove the accessory from the first rail.

Embodiment 8. The accessory mounting platform of any one or more of the embodiments, further comprising an accessory that is selectively coupled to the first rail, wherein the accessory is selectable from a plurality of accessories each having a different functionality.

Embodiment 9. The accessory mounting platform of any one or more of the embodiments, wherein the body comprises a U-shape, and wherein the body is configured to fit around a portion of the tool.

Embodiment 10. The accessory mounting platform of any one or more of the embodiments, wherein the accessory mounting platform is compatible with a plurality of different types of tools, including power tools.

Embodiment 11. A tool comprising: a tool body; a working element coupled to the tool body; an accessory mounting platform comprising: a body coupled to the tool body; a first rail coupled to the body; and a locking component having a locked state and an unlocked state; and an accessory removably coupled to the first rail of the accessory mounting platform, wherein the accessory is selectable from a plurality of accessories each having a different functionality, wherein the locking component automatically moves from a locked state to an unlocked state when the accessory is slid along the first rail over the locking component in a first direction, and wherein the locking component automatically moves to the locked state once the accessory reaches a locked position on the first rail.

Embodiment 12. The tool of any one or more of the embodiments, wherein the tool body comprises a handle and a battery receiving area, and wherein the accessory mounting platform is disposed between the handle and the battery receiving area.

Embodiment 13. The tool of any one or more of the embodiments, wherein the accessory is reconfigurable between an in-use position and a stored position when the accessory is coupled to the first rail.

Embodiment 14. The tool of any one or more of the embodiments, wherein the accessory mounting platform further comprises a second rail coupled to the body, and wherein a second accessory is removably coupled to the second rail.

Embodiment 15. The tool of any one or more of the embodiments, wherein the locking component comprises: an arm having a proximal end and a distal end; and a tab disposed on the arm adjacent to the distal end of the arm, wherein a proximal end of the arm is integral with the first rail, and wherein the tab is configured to interface with the accessory to selectively lock the accessory to the first rail.

Embodiment 16. The tool of any one or more of the embodiments, wherein the tab defines a locking surface and an unlocking surface, and wherein a first ramp angle of the locking surface is greater than a second ramp angle of the unlocking surface.

Embodiment 17. A method of coupling an accessory to a tool, the method comprising: aligning the accessory with a rail of an accessory mounting platform coupled to the tool; and translating the accessory along the rail in a first direction until the accessory contacts a stop feature, wherein a locking component automatically locks the accessory to the rail when the accessory contacts the stop feature.

Embodiment 18. The method of any one or more of the embodiments, wherein translating the accessory along the rail causes an arm of the locking component to deflect, and wherein automatic locking the accessory to the rail occurs when a tab coupled to the arm of the locking component is clear of the accessory.

Embodiment 19. The method of claim 17, further comprising, prior to aligning the accessory with the rail, selecting the accessory from a plurality of accessories each having a different functionality.

Embodiment 20. The method of any one or more of the embodiments, further comprising detachably coupling the accessory mounting platform to the tool.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An accessory attachment feature for a tool, the accessory attachment feature comprising:

an accessory mounting platform comprising:

a body having a shaped engagement surface configured to seat on a correspondingly shaped reference surface of the tool to removably retain the accessory mounting platform at a fixed position relative to the tool;

a first rail coupled to the body, the first rail comprising a rail head; and a locking component; and an accessory comprising:

a groove configured to slidably receive the first rail to couple the accessory to the accessory mounting platform; and an implement storage area configured to retain a plurality of implements, wherein at least some of the plurality of implements are removable from the implement storage area while the accessory is mounted to the accessory mounting platform, wherein the locking component automatically moves from a locked state to an unlocked state when the accessory is slid along the first rail over the locking component in a first direction, and wherein the locking component automatically moves to the locked state once the accessory reaches a locked position on the first rail.

2. The accessory attachment feature of claim 1, wherein the rail head is unitary with the body, and wherein the locking component is disposed on the rail head.

3. The accessory attachment feature of claim 1, further comprising a second rail coupled to the body, the second rail comprising a rail head configured to slidably receive the accessory.

4. The accessory attachment feature of claim 1, wherein the locking component comprises:

an arm including a proximal end and a distal end; and a tab disposed on the arm adjacent to the distal end of the arm, wherein a proximal end of the arm is integral with the first rail, and wherein the tab is configured to interface with the accessory to selectively lock the accessory to the first rail.

5. The accessory attachment feature of claim 4, wherein the tab defines a locking surface and an unlocking surface, and wherein a first ramp angle of the locking surface is different than a second ramp angle of the unlocking surface.

6. The accessory attachment feature of claim 5, wherein the first ramp angle is greater than the second ramp angle.

7. The accessory attachment feature of claim 1, wherein a peak force required to install the accessory on the first rail is less than a peak force required to remove the accessory from the first rail.

8. The accessory attachment feature of claim 1, further comprising an accessory that is selectively coupled to the first rail, wherein the accessory is selectable from a plurality of accessories each having a different functionality.

9. The accessory attachment feature of claim 1, wherein the body comprises a U-shape, and wherein the body is configured to fit around a portion of the tool.

10. The accessory attachment feature of claim 1, wherein the accessory mounting platform is compatible with a plurality of different types of tools, including power tools.

11. A tool comprising:

a tool body defining a shaped reference surface;

a working element coupled to the tool body;

an accessory mounting platform comprising:

a body having an engagement surface configured to seat on the shaped reference surface of the tool body to couple the accessory mounting platform to the tool body;

a first rail coupled to the body; and a locking component having a locked state and an unlocked state; and an accessory defining a groove configured to be slidably coupled to the first rail of the accessory mounting platform, wherein the accessory comprises an implement storage area configured to retain a plurality of implements, and wherein at least some of the plurality of implements are removable from the implement storage area when the accessory is mounted to the accessory mounting platform, wherein the locking component automatically moves from a locked state to an unlocked state when the accessory is slid along the first rail over the locking component in a first direction, and wherein the locking component automatically moves to the locked state once the accessory reaches a locked position on the first rail.

12. The tool of claim 11, wherein the tool body comprises a handle and a battery receiving area, and wherein the accessory mounting platform is disposed between the handle and the battery receiving area.

13. The tool of claim 11, wherein the accessory is reconfigurable between an in-use position and a stored position when the accessory is coupled to the first rail.

14. The tool of claim 11, wherein the accessory mounting platform further comprises a second rail coupled to the body, and wherein a second accessory is removably coupled to the second rail.

15. The tool of claim 11, wherein the locking component comprises:

an arm having a proximal end and a distal end; and a tab disposed on the arm adjacent to the distal end of the arm, wherein a proximal end of the arm is integral with the first rail, and wherein the tab is configured to interface with the accessory to selectively lock the accessory to the first rail.

16. The tool of claim 15, wherein the tab defines a locking surface and an unlocking surface, and wherein a first ramp angle of the locking surface is greater than a second ramp angle of the unlocking surface.

17. A method of coupling an accessory to a tool, the method comprising:

attaching an accessory mounting platform to a tool, the accessory mounting platform including a body having a shaped engagement surface configured to seat on a correspondingly shaped reference surface of the tool to removably retain the accessory mounting platform at a fixed position relative to the tool;

aligning a groove of the accessory with a rail of the accessory mounting platform, wherein the accessory comprises an implement storage area configured to retain a plurality of implements, wherein at least some of the plurality of implements are removable from the implement storage area while the accessory is mounted to the accessory mounting platform; and translating the accessory along the rail in a first direction until the accessory contacts a stop feature, wherein a locking component automatically locks the accessory to the rail when the accessory contacts the stop feature.

18. The method of claim 17, wherein translating the accessory along the rail causes an arm of the locking component to deflect, and wherein automatic locking the accessory to the rail occurs when a tab coupled to the arm of the locking component is clear of the accessory.

19. The method of claim 17, further comprising, prior to aligning the accessory with the rail, selecting the accessory from a plurality of accessories each having a different functionality.

20. The method of claim 17, further comprising detachably coupling the accessory mounting platform to the tool.

* * * * *